(12) United States Patent
Rose

(10) Patent No.: US 12,086,566 B2
(45) Date of Patent: Sep. 10, 2024

(54) SELECTING AN $I^{TH}$ LARGEST OR A $P^{TH}$ SMALLEST NUMBER FROM A SET OF N M-BIT NUMBERS

(71) Applicant: Imagination Technologies Limited, Kings Langley (GB)

(72) Inventor: Thomas Rose, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 257 days.

(21) Appl. No.: 16/670,482

(22) Filed: Oct. 31, 2019

(65) Prior Publication Data

US 2020/0133637 A1 Apr. 30, 2020

(30) Foreign Application Priority Data

Oct. 31, 2018 (GB) ...................................... 1817759
Jun. 28, 2019 (GB) ...................................... 1909370

(51) Int. Cl.
  *G06F 7/02* (2006.01)
  *G06F 7/24* (2006.01)
  (Continued)

(52) U.S. Cl.
  CPC ................ *G06F 7/026* (2013.01); *G06F 7/02* (2013.01); *G06F 7/24* (2013.01); *G06F 7/57* (2013.01); *G06F 7/78* (2013.01)

(58) Field of Classification Search
  CPC ............... G06F 7/026; G06F 7/06; G06F 7/10
  See application file for complete search history.

(56) References Cited

U.S. PATENT DOCUMENTS

| | | |
|---|---|---|
| 4,404,677 A | 9/1983 | Grande et al. |
| 4,802,108 A | 1/1989 | Bagdis et al. |
| | (Continued) | |

FOREIGN PATENT DOCUMENTS

JP        2000287078 A      10/2000

OTHER PUBLICATIONS

Yang et al., "A Novel Fast Median Filter Algorithm Without Sorting," Proc. SPIE 9897, Real-Time Image and Video Processing 2016, Apr. 29, 2016.

(Continued)

*Primary Examiner* — Emily E Larocque
(74) *Attorney, Agent, or Firm* — Potomac Law Group, PLLC; Vincent M DeLuca

(57) ABSTRACT

A method of selecting, in hardware logic, an $i^{th}$ largest or a $p^{th}$ smallest number from a set of n m-bit numbers is described. The method is performed iteratively and in the $r^{th}$ iteration, the method comprises: summing an $(m-r)^{th}$ bit from each of the m-bit numbers to generate a summation result and comparing the summation result to a threshold value. Depending upon the outcome of the comparison, the $r^{th}$ bit of the selected number is determined and output and additionally the $(m-r-1)^{th}$ bit of each of the m-bit numbers is selectively updated based on the outcome of the comparison and the value of the $(m-r)^{th}$ bit in the m-bit number. In a first iteration, a most significant bit from each of the m-bit numbers is summed and each subsequent iteration sums bits occupying successive bit positions in their respective numbers.

10 Claims, 13 Drawing Sheets

(51) Int. Cl.
*G06F 7/57* (2006.01)
*G06F 7/78* (2006.01)

(56) References Cited

U.S. PATENT DOCUMENTS

| | | | | |
|---|---|---|---|---|
| 5,511,189 | A | * | 4/1996 | Machida ................... G06F 7/24 |
| | | | | 340/146.2 |
| 2008/0288565 | A1 | | 11/2008 | Lin |
| 2011/0103692 | A1 | | 5/2011 | Williams |
| 2012/0002876 | A1 | * | 1/2012 | Williams .................. G06T 5/20 |
| | | | | 382/190 |
| 2013/0007419 | A1 | | 1/2013 | Bajenaru et al. |

OTHER PUBLICATIONS

Extended European Search Report dated Feb. 25, 2020, in European Application No. 19206051.5.
Nakayama et al., "An Algorithm to Perform the Rank Filter and Its Applications", Systems & Computers in Japan, Jan. 1986, vol. 17:1, pp. 19-25, Wiley, Hoboken, New Jersey.
Vinnakota, et al., "A New Circuit for Maximum Value Determination," IEEE Transactions on Circuits and Systems—I: Fundamental Theories and Applications, Dec. 1994, vol. 41:12, p. 929-930, Retrieved from the Internet: URL: https://ieeexplore.ieee.org/stampPDF/g etPDF.jsp?tp=&arnumber=340863&ref=aHR0cHM6Ly9pZWVleHBsb3JlLmllZWUub3JnL2RvY3VtZW50Lz M0MDg2Mw== (retrieved on Feb. 17, 2020).

* cited by examiner

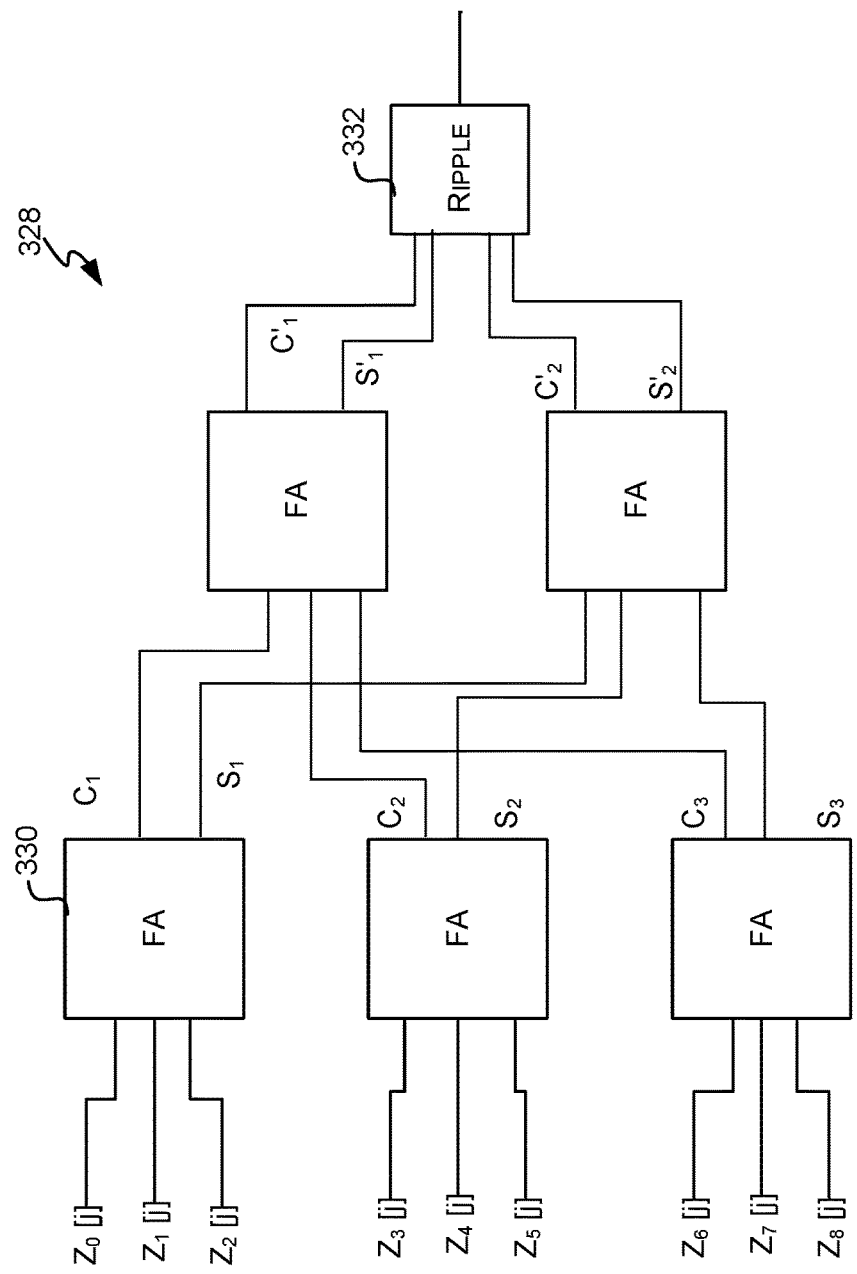

FIG. 12A
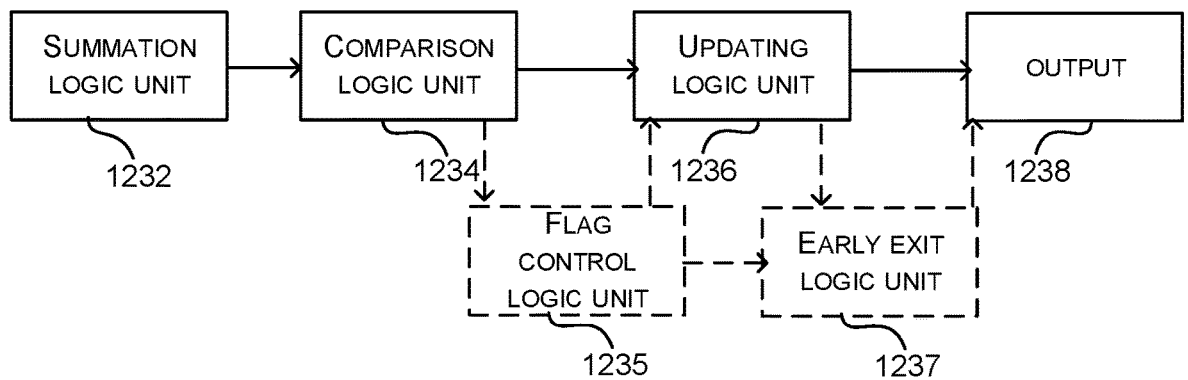
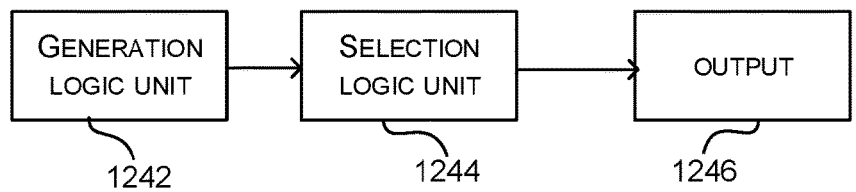
FIG. 12B
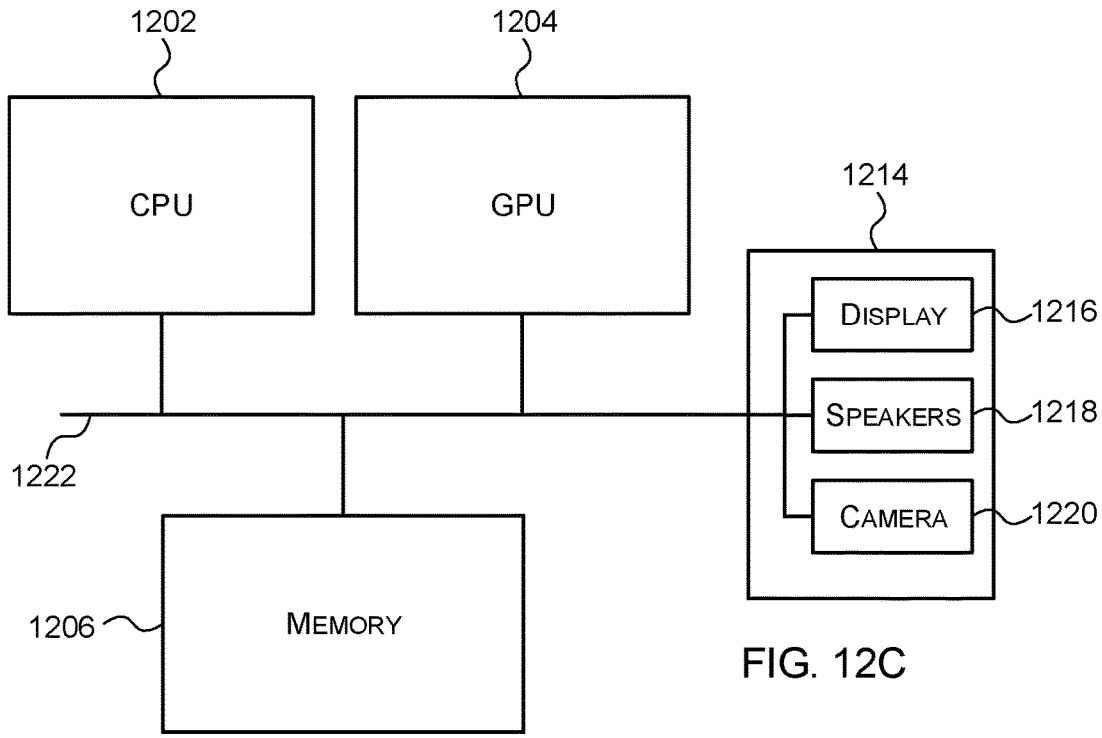
FIG. 12C

SELECTING AN $I^{TH}$ LARGEST OR A $P^{TH}$ SMALLEST NUMBER FROM A SET OF N M-BIT NUMBERS

BACKGROUND

There are many situations where hardware is required to sort two or more input binary numbers, i.e. to arrange them in order of size. Such sorters are typically constructed from a number of identical logic blocks as shown in FIG. 1. FIG. 1 shows a schematic diagram of an example hardware arrangement 100 for sorting 4 inputs, $x_1$, $x_2$, $x_3$, $x_4$ into size order, i.e. such that $output_1 \geq output_2 \geq output_3 \geq output_4$. It can be seen that this sorter 100 comprises 5 identical logic blocks 102 each of which outputs the largest and smallest (i.e. max and min) values of two inputs (which may be denoted a and b).

Each of the logic blocks 102 receives two n-bit integer inputs (a,b) and comprises a comparator that returns a Boolean that indicates whether a>b. The output of the comparator, which may be referred to as the 'select' signal, is then used to control a plurality of n-bit wide multiplexers that each choose between n-bits from a or n-bits from b. If the logic block 102 outputs both the maximum and minimum values (from a and b, as shown in the examples in FIG. 1), the select signal is used to control the multiplexing of 2n-bits (e.g. in the form of 2n 1-bit wide multiplexers or two n-bit wide multiplexers). Alternatively, if the logic block has only one output (which is either the maximum or minimum of a and b), the select signal is used to control the multiplexing of n-bits (e.g. in the form of n 1-bit wide multiplexers or one n-bit wide multiplexer).

In the arrangement described above, the select signal is used to power a plurality of logic elements (e.g. logic gates) within a logic block 102 and this results in a large propagation delay. This effect of a delay is caused by a single gate output wire having to charge the transistors in a large number of gates (before these latter gates can propagate their outputs) and may be referred to as 'fanout'. Whilst this delay may be acceptable when only sorting two input numbers, where these logic blocks 102 are concatenated (e.g. as in the sorter 100 shown in FIG. 1 or larger sorters for more than 4 inputs) the resulting delay of the sorting circuit increases which may seriously impact performance (e.g. it may result in the sorting process taking more than a single clock cycle).

A solution to this delay is to include a large number of buffers (e.g. at least n buffers, which may be arranged in a tree structure) with each of the buffers being driven by the select signal; however, this results in a hardware arrangement that is significantly larger (e.g. in terms of area of logic).

The embodiments described below are provided by way of example only and are not limiting of implementations which solve any or all of the disadvantages of known hardware and methods for sorting numbers and/or selecting a number from a set of numbers based on its ordered position in the set.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of selecting, in hardware logic, an $i^{th}$ largest or a $p^{th}$ smallest number from a set of n m-bit numbers is described. The method is performed iteratively and in the $r^{th}$ iteration, where r is between 1 and m, the method comprises: summing the $(m-r)^{th}$ bit, where the $(m-1)^{th}$ bit is the most significant bit, from each of the m-bit numbers to generate a summation result and comparing the summation result to a threshold value. Depending upon the outcome of the comparison, the $(m-r)^{th}$ bit of the selected number is determined and output and additionally the $(m-r-1)^{th}$ bit of each of the m-bit numbers is selectively updated based on the outcome of the comparison and the value of the $(m-r)^{th}$ bit in the m-bit number. In a first iteration, r=1 and the most significant bit from each of the m-bit numbers is summed and the most significant bit of the selected number is output. Each subsequent iteration sums the most significant bits of the numbers yet to be summed, which are the bits occupying successive bit positions in their respective numbers (for r=2 bits in position m−2, for r=3 bits in position m−3, etc.) and outputs the next bit of the selected number. There are examples of this method which also output the index of the $i^{th}$ largest or a $p^{th}$ smallest number.

A first aspect provides a method of selecting, in hardware logic, a number from a set of n m-bit numbers, wherein the selected number is either an $i^{th}$ largest or a $p^{th}$ smallest number from the set of n m-bit numbers, where i, p, m and n are integers, the method comprising a plurality of iterations and each of the iterations comprising: summing a bit from each of the m-bit numbers to generate a summation result, wherein all the bits being summed occupy an identical bit position within their respective number; comparing the summation result to a threshold value, wherein the threshold value is calculated based on i or p; setting, based on an outcome of the comparison, a bit of the selected number; and for each of the m-bit numbers, based on the outcome of the comparison and a value of the bit from the m-bit number, selectively updating a bit in the m-bit number occupying a next bit position, wherein in a first iteration, a most significant bit from each of the m-bit numbers is summed and a most significant bit of the selected number is set and each subsequent iteration sums bits occupying successive bit positions in their respective numbers and sets a next bit of the selected number, and wherein the method comprises outputting data indicative of the selected number.

A second aspect provides a hardware logic unit arranged to select an $i^{th}$ largest or $p^{th}$ smallest number from a set of n m-bit numbers, where i, p, m and n are integers, the hardware logic unit being arranged to operate iteratively and comprising: summation logic arranged to, in each iteration, sum a bit from each of the m-bit numbers to generate a summation result, wherein all the bits being summed occupy an identical bit position within their respective number such that in a first iteration, a most significant bit from each of the m-bit numbers is summed and each subsequent iteration sums bits occupying successive bit positions in their respective numbers; comparison logic arranged to, in each iteration, compare the summation result generated by the summation logic in that iteration to a threshold value and set a bit of the selected number based on an outcome of the comparison, wherein the threshold value is calculated based on i or p; updating logic arranged to, in each iteration and for each of the m-bit numbers, selectively update a bit in the m-bit number occupying a next bit position based on the outcome of the comparison in that iteration and a value of the bit from the m-bit number; and an output arranged to output data indicative of the selected number.

A third aspect provides a hardware logic unit configured to perform the method described above.

A fourth aspect provides a method of manufacturing, using an integrated circuit manufacturing system, a hardware logic unit as detailed above.

A fifth aspect provides an integrated circuit definition dataset that, when processed in an integrated circuit manufacturing system, configures the integrated circuit manufacturing system to manufacture a hardware logic unit as detailed above.

A sixth aspect provides a computer readable storage medium having stored thereon a computer readable description of an integrated circuit that, when processed in an integrated circuit manufacturing system, causes the integrated circuit manufacturing system to manufacture a hardware logic unit as detailed above.

A seventh aspect provides an integrated circuit manufacturing system comprising: a computer readable storage medium having stored thereon a computer readable description of an integrated circuit that describes a hardware logic unit as detailed above; a layout processing system configured to process the integrated circuit description so as to generate a circuit layout description of an integrated circuit embodying the hardware logic unit; and an integrated circuit generation system configured to manufacture the hardware logic unit according to the circuit layout description.

An eighth aspect provides a method, implemented in hardware logic, for generating and selecting a number, the method comprising: performing a MSB-first (most significant bit first) iterative generating process for generating a set of n numbers; concurrently with performing the MSB-first iterative generating process for generating the set of n numbers, performing a MSB-first iterative selection process to select either an $i^{th}$ largest or a $p^{th}$ smallest number from the set of n numbers, where i, p and n are integers; and in response to the MSB-first iterative selection process determining that a particular one of the numbers of said set of n numbers will not be the selected number, halting the generation of said particular number by said MSB-first iterative generating process after at least one of the bits of said particular number has been generated and before all of the bits of said particular number have been generated, wherein the method comprises outputting data indicative of the selected number.

A ninth aspect provides a processing unit configured to generate and select a number, the processing unit comprising: a generation logic unit, implemented in hardware, configured to perform a MSB-first iterative generating process for generating a set of n numbers; a selection logic unit, implemented in hardware, configured to operate concurrently with the generation logic unit, and configured to perform a MSB-first iterative selection process to select either an $i^{th}$ largest or a $p^{th}$ smallest number from the set of n numbers, where i, p and n are integers; and an output arranged to output data indicative of the selected number, wherein the processing unit is configured to, in response to the selection logic unit determining that a particular one of the numbers of said set of n numbers will not be the selected number, cause the generation logic unit to halt the generation of said particular number by said MSB-first iterative generating process after at least one of the bits of said particular number has been generated and before all of the bits of said particular number have been generated.

A tenth aspect provides a processing unit configured to perform the method for generating and selecting a number, as detailed above.

An eleventh aspect provides a method of manufacturing, using an integrated circuit manufacturing system, a processing unit as detailed above.

A twelfth aspect provides an integrated circuit definition dataset that, when processed in an integrated circuit manufacturing system, configures the integrated circuit manufacturing system to manufacture a processing unit as detailed above.

A thirteenth aspect provides a computer readable storage medium having stored thereon a computer readable description of an integrated circuit that, when processed in an integrated circuit manufacturing system, causes the integrated circuit manufacturing system to manufacture a processing unit as detailed above.

A fourteenth aspect provides an integrated circuit manufacturing system comprising: a computer readable storage medium having stored thereon a computer readable description of an integrated circuit that describes a processing unit as detailed above; a layout processing system configured to process the integrated circuit description so as to generate a circuit layout description of an integrated circuit embodying the processing unit; and an integrated circuit generation system configured to manufacture the processing unit according to the circuit layout description.

The number sorting hardware logic unit and/or processor comprising hardware logic configured to perform one of the methods as described herein may be embodied in hardware on an integrated circuit. There may be provided a method of manufacturing, at an integrated circuit manufacturing system, a number sorting hardware logic unit and/or a processor comprising hardware logic configured to perform one of the methods as described herein. There may be provided an integrated circuit definition dataset that, when processed in an integrated circuit manufacturing system, configures the system to manufacture an number sorting hardware logic unit and/or a processor comprising hardware logic configured to perform one of the methods as described herein. There may be provided a non-transitory computer readable storage medium having stored thereon a computer readable description of an integrated circuit that, when processed, causes a layout processing system to generate a circuit layout description used in an integrated circuit manufacturing system to manufacture a number sorting hardware logic unit and/or a processor comprising hardware logic configured to perform one of the methods as described herein.

There may be provided an integrated circuit manufacturing system comprising: a non-transitory computer readable storage medium having stored thereon a computer readable integrated circuit description that describes the number sorting hardware logic unit and/or processor comprising hardware logic configured to perform one of the methods as described herein; a layout processing system configured to process the integrated circuit description so as to generate a circuit layout description of an integrated circuit embodying the number sorting hardware logic unit and/or processor comprising hardware logic configured to perform one of the methods as described herein; and an integrated circuit generation system configured to manufacture the number sorting hardware logic unit and/or processor comprising hardware logic configured to perform one of the methods as described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 3E shows a truth table for the hardware arrangement shown in FIG. 3D;

FIG. 3F shows a schematic diagram of an example hardware arrangement that implements an operation in the method of FIG. 3A;

FIG. 12A is a schematic diagram of a hardware logic unit arranged to select the $i^{th}$ largest number or the $p^{th}$ smallest number from an input set of n m-bit numbers;

FIG. 12B is a schematic diagram of a processing unit arranged to generate and select a number;

FIG. 12C shows a computer system in which a graphics processing system is implemented;

Figure 1:
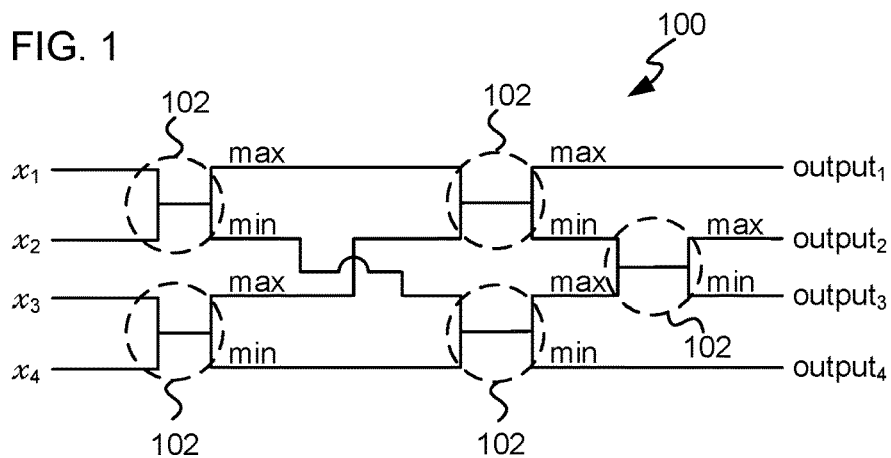
FIG. 1 is a schematic diagram of an example hardware arrangement for sorting 4 inputs.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

There are many applications where it is useful to select the $i^{th}$ largest or $p^{th}$ smallest integer from a set of integers. Typically this is implemented using a sorting algorithm, or sorting network (e.g. as described above with reference to FIG. 1) to sort the integers into an ordered list and then the relevant integer from the list can be output. However, the size of the resulting hardware can be large, even if redundant logic (which doesn't affect the required output) is removed as part of the synthesis of the hardware.

Described herein is a method and hardware for selecting the $i^{th}$ largest or $p^{th}$ smallest number from a set of n m-bit numbers without first sorting the set of numbers. Using the methods described herein, the hardware is smaller than a sorting network, e.g. it scales in area as $O(n*m)$ rather than $O(m*n*(\ln(n)^2))$. Furthermore, as the method is iterative, the area of the hardware used to implement the method can be made even smaller by trading performance/throughput (e.g. by synthesizing only one iteration or less than m iterations and then reusing the hardware logic over multiple cycles). Additionally, the method enables performance/throughput to be increased at a cost of additional area (e.g. by increasing the number of bits that are assessed in each iteration above 1).

The methods described herein may be adapted to apply to numbers represented in signed or unsigned fixed point format, floating point format and signed or unsigned normalised format. For example, for signed and floating point numbers, the top bit of each number is negated on both input to the method and output from the method. For unsigned fixed point numbers, no changes are required to the methods. For normalised formats, the bit string is treated as a normal unsigned (or signed) number. In various examples, the numbers may be integers. In various examples, the numbers may be binary approximations of values with no finite binary representation in the standard fixed point format (e.g. ⅓ or the square root of 2), where the binary approximations are generated one bit at a time.

The method involves examining the most significant bit (MSB) from each of the numbers in the set and based on the outcome of the analysis setting one or more flags or mask bits. The method is then repeated, selecting the next bit from each of the numbers in the set, adjusting the bit values dependent upon the flags or mask bits and then performing the same analysis (or very similar analysis) as was performed on the MSB. As with the first iteration (that involved the MSBs), based on the outcome of the analysis, one or more flags or mask bits may be set. The method may iterate through each of the m bits in the numbers in order to determine which of the numbers is the $i^{th}$ largest or $p^{th}$ smallest number. In each iteration, a bit from the output number (i.e. the $i^{th}$ largest or $p^{th}$ smallest number) is set and the output from the method may be either the output number itself or other data that identifies (or indicates) the output number from within the set of n m-bit numbers (e.g. in the form of an index of the output number within the set of n numbers).

In describing the various embodiments and examples below, the following notation is used, which can be described with reference to FIG. 2:

n is the number of numbers in the set 200, k is the number index and ranges between 0 and (n−1), $N_k$ are the numbers in the set 200, such that the first number 202 in the set 200 is $N_0$ and the last number 204 in the set 200 is $N_{n-1}$, m is the number of bits in each of the numbers in the set and each number in the set comprises the same number of bits, j is the bit index and ranges between (m−1) for the MSB 206 and 0 for the least significant bit (LSB) 208 in each number, and in examples where the method analyses a single bit from each number in the set in each iteration (from the MSB to the LSB), j may also be referred to as the iteration index, r is the iteration number that ranges between one (for the first iteration, where j=m−1) and m (for the last iteration, where j=0), hence j=m−r in examples in which one bit position is considered per iteration.

$x_k[j]$ refers to bit j of the number $N_k$, where j=m−1 for the MSB and j=0 for the LSB, $z_k[j]$ refers to the modified bit j of the number $N_k$, i and p are integers in the range 1 to n and the methods described herein identify the $i^{th}$ largest or $p^{th}$ smallest number from the set of numbers, and the desired number, i.e. the $i^{th}$ largest or $p^{th}$ smallest number, is referred to herein as the output number, $min_k[j]$ is the minimum flag (or min_flag) for the number $N_k$ following analysis of the $j^{th}$ bit of the number $N_k$, $min_k[m]$ is the initial (i.e. starting) value of the minimum flag for the number $N_k$, $max_k[j]$ is the maximum flag (or max_flag) for the number $N_k$ as set following analysis of the $j^{th}$ bit of the number $N_k$, $max_k[m]$ is the initial (i.e. starting) value of the maximum flag for the number $N_k$, $flag_k[j]$ is the flag for the number $N_k$ as set following analysis of the $j^{th}$ bit of the number $N_k$ in examples where a single flag is used, and $flag_k[m]$ is the initial (i.e. starting) value of the single flag for the number $N_k$.

Figure 2:
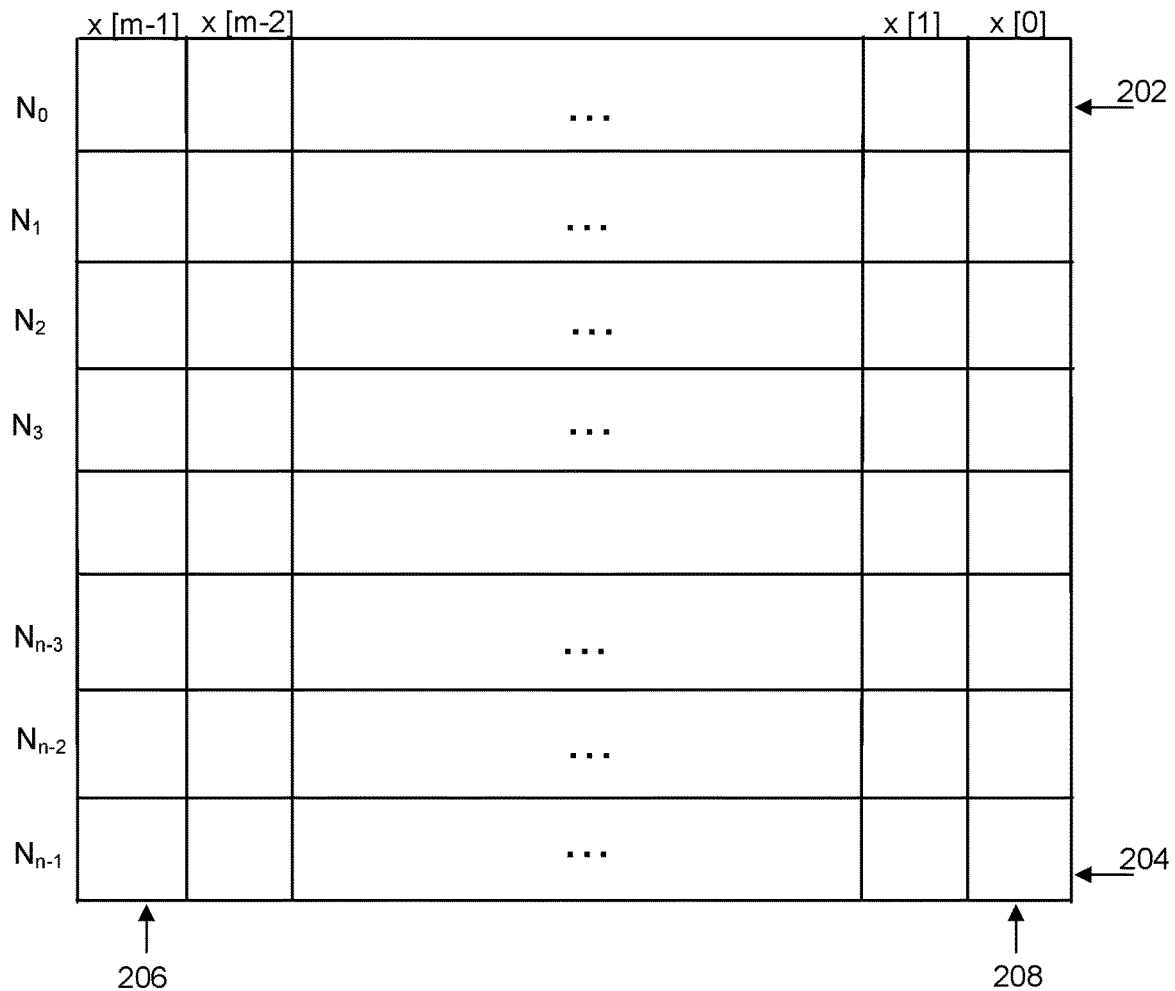
FIG. 2 shows a graphical representation of the set of n m-bit numbers which are input to the methods and hardware described herein.

FIG. 2 shows a graphical representation of the set 200 of n m-bit numbers which are input to the methods and hardware described herein. The numbers within the set are not in any particular order and hence the value of k only identifies the position of the number in the set (and hence is used to refer to a particular number $N_k$) and does not provide any information about the relative size of the number $N_k$ compared to other numbers in the set 200.

The methods and hardware described herein may be used to find the $i^{th}$ largest or $p^{th}$ smallest number from the set 200 of n m-bit numbers without first sorting the set of numbers.

Figure 3A:
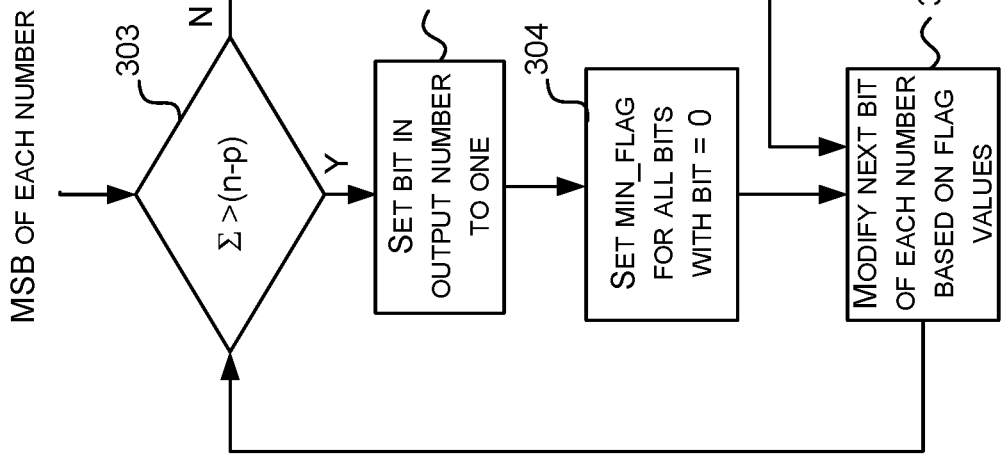
FIG. 3A is a flow diagram showing a first example method of calculating the $i^{th}$ largest number from the input set of n m-bit numbers.

FIG. 3A is a flow diagram of a first example method of calculating (or identifying) the $i^{th}$ largest number from the input set of n m-bit numbers. In various examples the value of i is fixed and in other examples, the value of i is an input variable. As shown in FIG. 3A, the method is iterative and uses two flags per number: min_flag and max_flag (i.e. 2n flag bits in total). The minimum flag, min_flag or $min_k[\ ]$, when set indicates that the particular number is smaller than the output number (the $i^{th}$ largest number) and the maximum flag, max_flag or $max_k[\ ]$, when set indicates that the particular number is larger than the output number. Initially (when j=m), the flags may all be unset (e.g. set to zero) unless some pre-masking has been performed (as described below). As described below, the method builds up the output number, one bit per iteration.

In the first iteration (r=1, j=m−1) the MSBs 206 of each number are summed and if the sum of the MSBs is greater than or equal to i ('Yes' in block 302) then this means that the MSB of the $i^{th}$ largest number from the input set (i.e. the MSB of the output number) is a one and the MSB of the output number may be set to one (block 305). However, if the sum of the MSBs is less than i ('No' in block 302), then this means that the MSB of the $i^{th}$ largest number from the input set (i.e. the MSB of the output number) is a zero and the MSB of the output number may be set to zero (block 307). Additionally, in response to determining that the sum of the MSBs is greater than or equal to i ('Yes' in block 302), the min_flag is set for all those numbers with an MSB=0 (block 304) and in response to determining that the sum of the MSBs is not greater than or equal to i ('No' in block 302), the max_flag is set for all those numbers with an MSB=1 (block 306).

The second iteration (r=2, j=m−2) starts by taking the next bit from each of the numbers and modifying the bits using the flag values (block 308). In particular, the value of the bits may be altered where either the min_flag or the max_flag is set for the number (i.e. the value of the bits are selectively updated based on the flags and the values of the bits)), as shown in FIG. 3C. If the max_flag for the number is set ('Yes' in block 310), then the bit from that number (i.e. the second most significant bit from the number for the second iteration) is set to one (block 312) irrespective of whether the bit value is actually a one or a zero. Similarly, if the min_flag for the number is set ('Yes' in block 314), then the bit is set to zero (block 316) irrespective of whether the bit value is actually a one or a zero. According to the methods described herein, a number cannot have both the max_flag and the min_flag set. If neither flag is set ('No' in blocks 310 and 314) then the value of the bit is left unchanged (block 318).

The alteration of the bits (in block 308, as shown in detail in FIG. 3C) can also be described by the following logic equation:

$$z_k[j] = x_k[j] \cdot \overline{min_k[j+1]} + max_k[j+1]$$

where · represents a logical AND operation and + represents a logical OR operation. The corresponding hardware arrangement 320, which may be replicated n-times (one for each number in the set 200) is shown in FIG. 3D and comprises a NOT gate 322, an AND gate 324 and an OR gate 326. As shown in FIG. 3D, the current bit is combined with an inverted version of the current minimum flag (as set in the previous iteration) in an AND gate 324 and then the output of the AND gate 324 is combined with the current maximum flag (as set in the previous iteration) in an OR gate 326. The truth table for the reachable states of the hardware arrangement 320 is shown in FIG. 3E.

The altered bits (as generated in block 308) are then summed and if the sum is greater than or equal to i ('Yes' in block 302) then this means that the next bit of the $i^{th}$ largest number from the input set (i.e. the next bit of the output number) is a one and the next bit of the output bit may be set to one (block 305); however, if the sum is less than i ('No' in block 302), then this means that the next bit of the $i^{th}$ largest number from the input set (i.e. the next bit of the output number) is a zero and the next bit of the output number may be set to zero (block 307). In this way the method builds the output number (in blocks 305 and 307), one bit at a time and one bit per iteration. In response to determining that the sum is greater than or equal to i ('Yes' in block 302), the min_flag is set for all those numbers with an altered bit equal to zero (block 304) and in response to determining that the sum is not greater than or equal to i ('No' in block 302), the max_flag is set for all those numbers with an altered bit equal to one (block 306).

The summing of the bits (in block 302) can also be described by the following logic equation:

$$\text{sum}_j = \Sigma_{k=0}^{n-1} z_k[j]$$

The corresponding hardware arrangement 328 comprises a plurality of adders (e.g. a plurality of full adders 330 which each add together three bits, i.e. for three different values of k, followed by one or more ripple carry adders 332). An example hardware arrangement is shown in FIG. 3F; however the summation may be implemented in hardware in other ways.

The updating of the minimum flag (in block 304) and maximum flag (in block 306) can also be described by the following logic equations:

$$y[j] = (\text{sum}_j \geq i)?1:0$$

$$\min_k[j] = \min_k[j+1] + (y[j] \cdot \overline{x_k[j]} \cdot \overline{\max_k[j+1]})$$

$$\max_k[j] = \max_k[j+1] + (\overline{y[j]} \cdot x_k[j] \cdot \overline{\min_k[j+1]})$$

In these last two equations, the first terms refer to the flag values from the previous iteration and are used to ensure that the flag is not changed if it has already been set by an earlier bit within a number. The same two last equations may also be used when referring to the altered bits ($z_k[j]$) by simply replacing $x_k[j]$ by $z_k[j]$, as $x_k[j] = z_k[j]$ when both flags are 0 and if either of the flags are 1 then the value of $x_k[j]$ is irrelevant in the equations above, however the hardware implementation using the altered bits may be larger (in terms of area of hardware logic) than using the original bits. The corresponding hardware arrangements 336, 338 are shown in FIGS. 3G and 3H and comprise a combination of NOT, AND and OR gates (or other logic blocks which implement the same functionality as the NOT, AND and OR gates and which may be referred to as NOT, AND and OR logic blocks).

The method of FIG. 3A may then be repeated for all m bits in the input numbers to build up the output number or, in various examples, there may be additional logic that identifies when a result has been obtained before all m iterations are complete (i.e. when there is only one distinct value in the set of numbers 200 that has neither the max_flag nor the min_flag set) and outputs the result at that stage. In various examples, the additional logic may additionally, or instead, be used to limit the number of iterations that are performed (i.e. to provide a maximum value of r, $r_{max}$) and then output the result at that stage. In such examples, only a part of the output number has been built up and so the remaining bits, or the entire output number, may be obtained by selecting one of the numbers from the set of input numbers based on the flag values, or alternatively, other data that identifies the output number (e.g. the number index, k) may be output. Although if the set of input numbers may include duplicate values (i.e. if it is not guaranteed that all the n numbers in the input set are unique), such that there may be more than one input number that is the $i^{th}$ largest number in the input set of n m-bit numbers, then this adds complexity to the additional logic and so the benefit of having the additional logic may be reduced or lost. This additional logic may be referred to as an early exit logic unit.

Performing a bitwise OR on the $\min_k[j]$ and $\max_k[j]$ signals and then negating the result yields a signal which has a 1 in the $k^{th}$ bit if, and only if, bits m−1 to j of the output number matches bits m−1 to j in the number $N_k$.

The method of FIG. 3A can be described with reference to the example shown in FIG. 4, where n=5 and i=3. In the first iteration 402, the MSBs of each number are summed and the result is 3. As the sum is equal to i ('Yes' in block 302), the MSB of the output number 403 is set to one (block 305) and the min_flag is set for those numbers where the MSB is zero (block 304). In the example shown, the min_flag is set for numbers $N_1$ and $N_4$.

In the second iteration, the next bits in each of the 5 numbers are first modified based on the flag values (block 308) to get the $z_k[m−2]$ values and in this example, as only the flags for numbers $N_1$ and $N_4$ are set, only these bits are modified from a one to a zero. The modified bits 404 are then summed and the result is 1. As the sum is less than i ('No' in block 302), the next bit of the output number is set to zero (block 307) and the max_flag is set for those numbers where the modified bit is one (block 306). In the example shown, the max_flag is set for number $N_2$.

Figure 4:
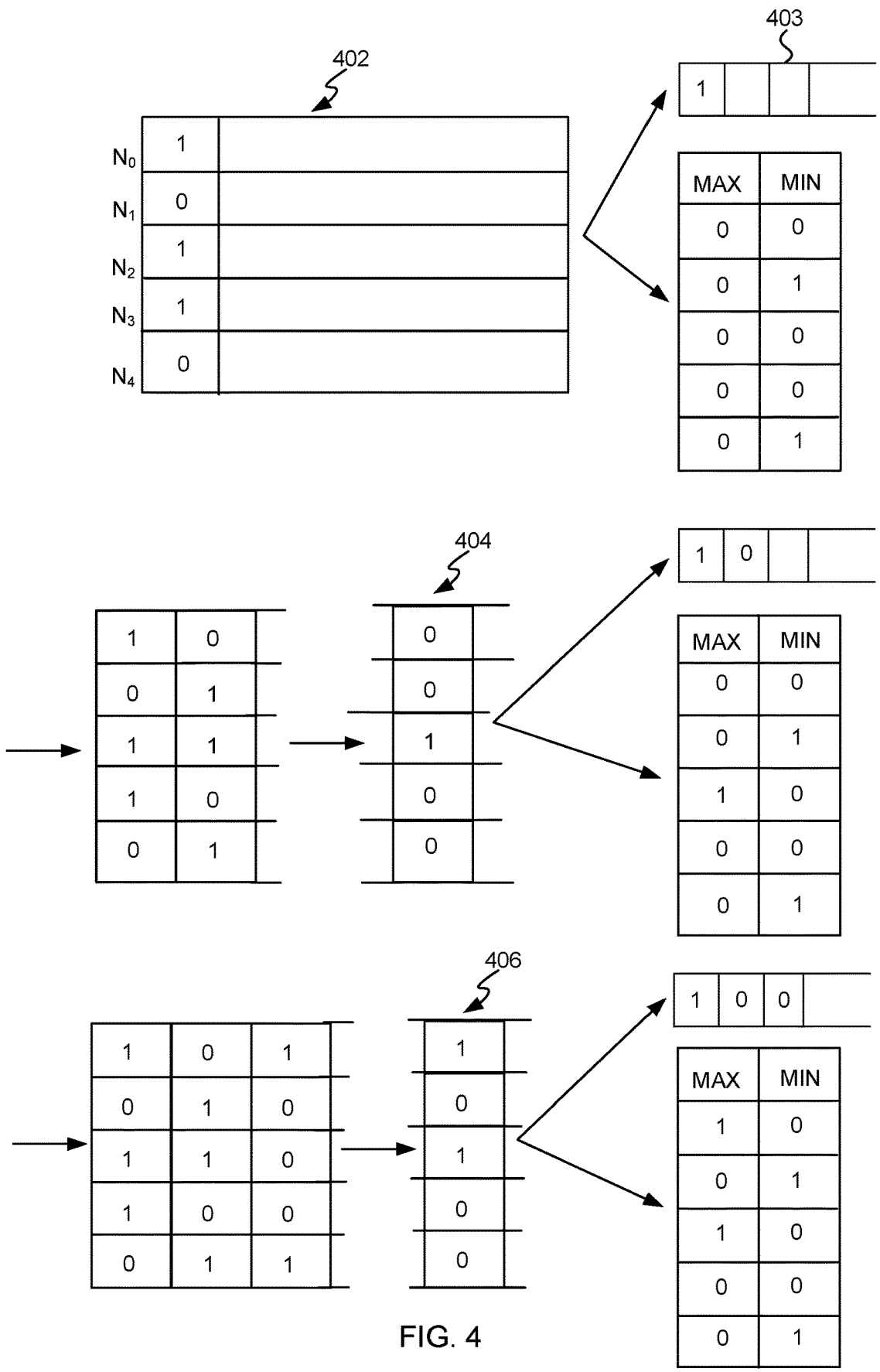
FIG. 4 illustrates an example of the operation of the method of FIG. 3A.

The third iteration again starts by modifying the next bits in each of the 5 numbers based on the flag values (block 308) to get the $z_k[m−3]$ values and in this example, as the flags for numbers $N_1$, $N_2$ and $N_4$ are set, only these bits are affected, although as shown in FIG. 4, whilst the values of the $3^{rd}$ bits of numbers $N_2$ and $N_4$ are flipped (from a 0 to a 1 for number $N_2$ because of the max_flag and from a 1 to a 0 for number $N_4$ because of the min_flag) the $3^{rd}$ bit of number $N_1$ is not modified as it is already a zero and it is the min_flag that is set. As before the modified bits 406 are summed and in this case the result is 2. As the sum is less than i ('No' in block 302), the next bit of the output number is set to zero (block 307) and the max_flag is set for those numbers where the modified bit is one (block 306). In the example shown, the max_flag is set for number No. At this point there is only one number which does not have a flag that is set, number $N_3$, and this is therefore the output number, i.e. the $i^{th}$ largest number from the input set. The method may stop at this point (e.g. if logic is provided to assess the flags and determine when only one number does not have a flag set) or the method may continue until all bits have been assessed.

It can be appreciated that if m=8 in the example of FIG. 4 and the five input values ($N_0$-$N_4$) are 101xxxxx, 010xxxxx, 110xxxxx, 100xxxxx and 011xxxxx (where each x can represent either 0 or 1) then as shown in FIG. 4, the third largest number is determined to be 100xxxxx, and this can be determined just by analysing the first three bits of the inputs values in this example. As described above, following the third iteration, only the three most significant bits of the output number 403 (bits 100) have been built up and the remaining five bits may be determined either by continuing with the remaining five iterations of the method or by selecting $N_3$ based on the flag values and either adding the 5 LSBs to the already generated output number 403 or outputting $N_3$ and discarding the three bits that have already been built up. Alternatively, instead of outputting the output number itself, data identifying that output number (e.g. the index k=3) may be output.

Figure 3B:
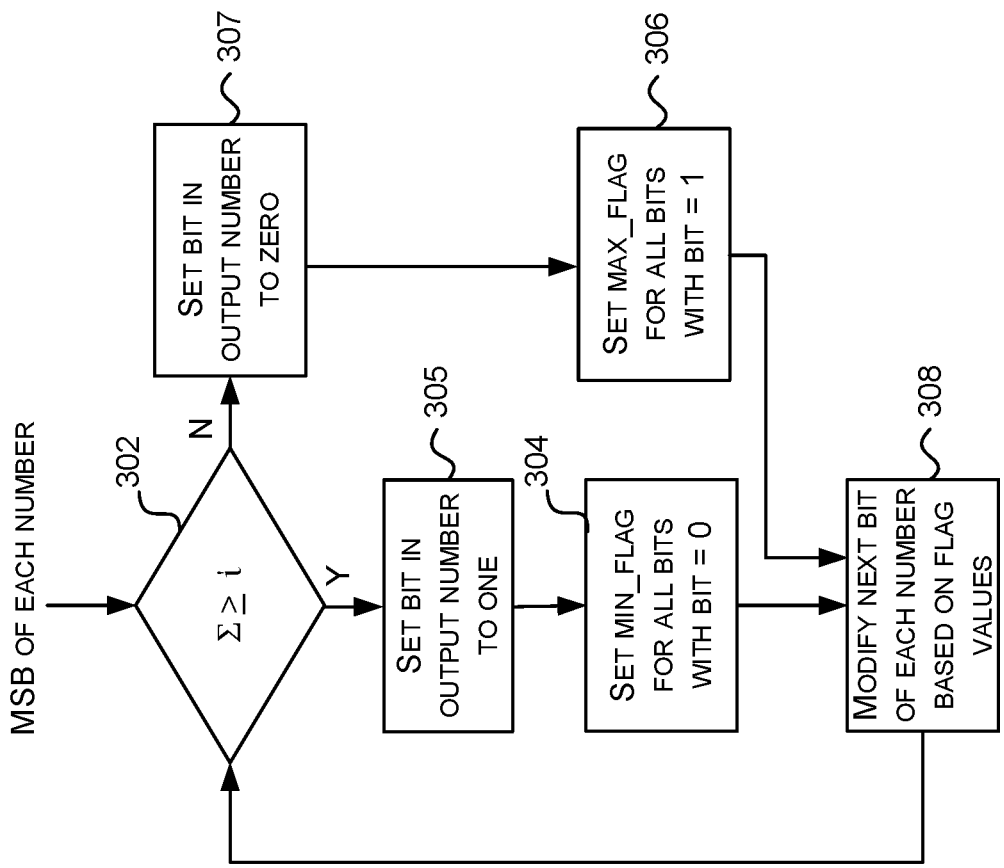
FIG. 3B is a flow diagram showing a first example method of calculating the $p^{th}$ smallest number from the input set of n m-bit numbers.
Figure 3C:
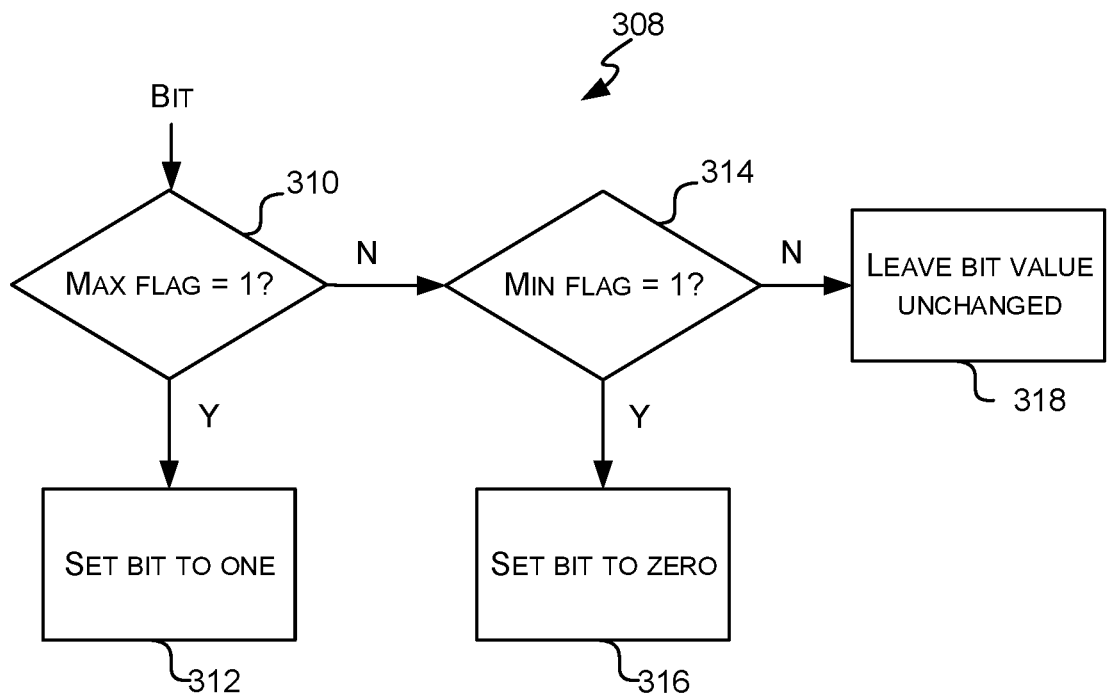
FIG. 3C is a flow diagram showing an operation from the methods of FIGS. 3A and 3B in more detail.
Figure 3D:
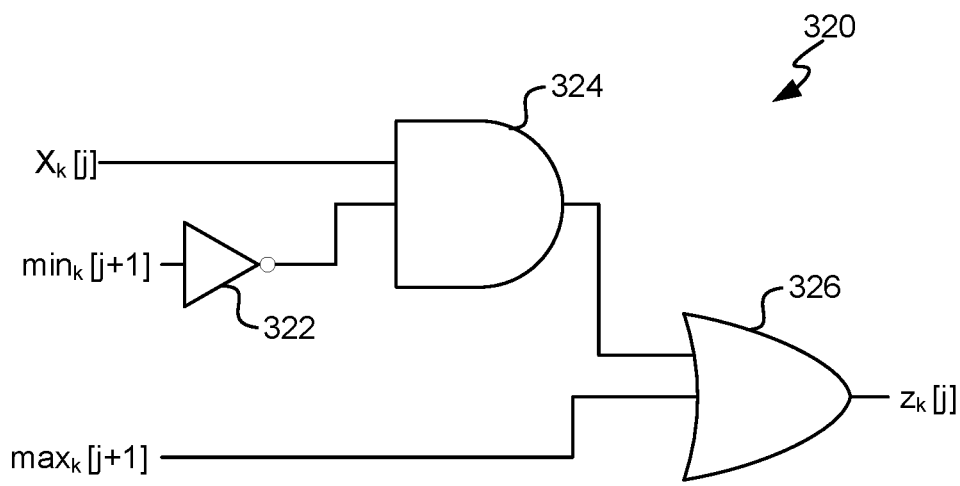
FIG. 3D is a circuit diagram of an example hardware implementation of the operation shown in FIG. 3C.
Figure 3G:
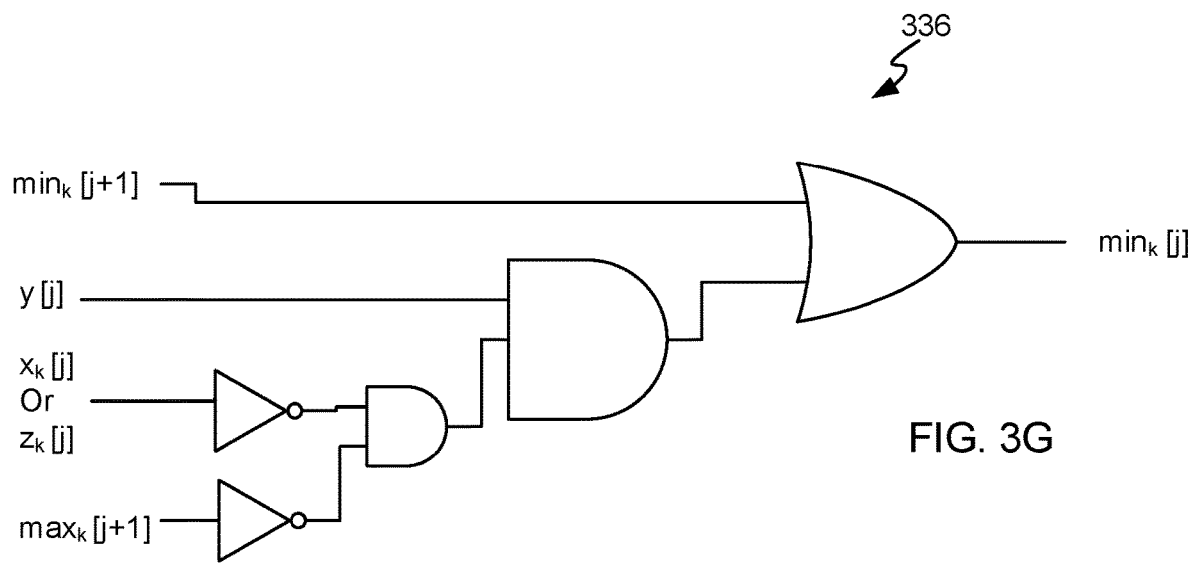
FIGS. 3G and 3H show schematic diagrams of two different example hardware arrangements that implements an operation in the methods of FIGS. 3A and 3B.
Figure 3H:
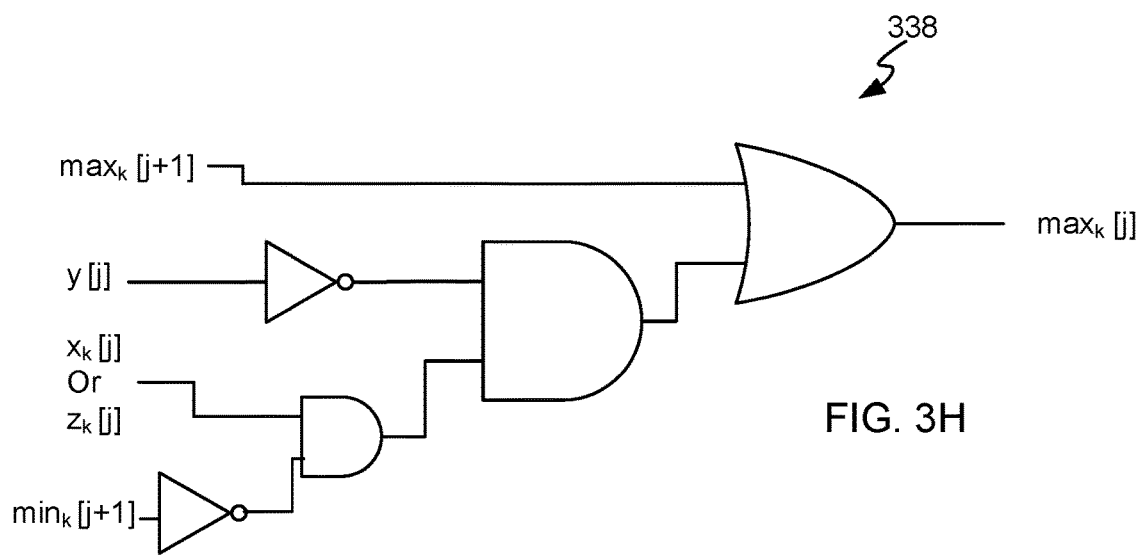

Whilst FIG. 3A shows a first example method of calculating (or identifying) the $i^{th}$ largest number from the input set of n m-bit numbers, a very similar method may be used to calculate (or identify) the $p^{th}$ smallest number from the input set of n m-bit numbers and one example is shown in FIG. 3B. In the method of FIG. 3B, the only differences compared to the method of FIG. 3A, are that the summation is compared to the value of (n−p) and the comparison switches from 'greater than or equal' (in block 302 of FIG. 3A) to 'strictly greater than' (in block 303 of FIG. 3B). Alternatively, the comparison performed in block 303 of FIG. 3B may be whether the sum is greater than or equal to (n+1−p). If the sum of MSBs (or altered bits for subsequent iterations) is greater than (n−p) ('Yes' in block 303), the MSB of the output number is set to one (block 305) and the min_flag is set for all those numbers with an MSB or altered bit equal to zero (block 304). If, however, the sum is not greater than (n−p) ('No' in block 303), the MSB of the output number is set to zero (block 307) and the max_flag is set for all those numbers with an MSB or altered bit equal to one (block 306). As before, the method is then repeated for subsequent bits in each of the numbers in the input set to build up the output number. The method may terminate either after m iterations or, where the additional hardware is provided, in response to determining that there is only a single number in the input set that does not have any flags set.

In another example method of calculating the $p^{th}$ smallest number from the input set of n m-bit numbers, all the input numbers $N_k$ may be bitwise inverted ($N_k \rightarrow \overline{N_k}$) and then the method of FIG. 3A may be used with i=p, so long as the final output is inverted back to its original form prior to being output.

Figure 5:
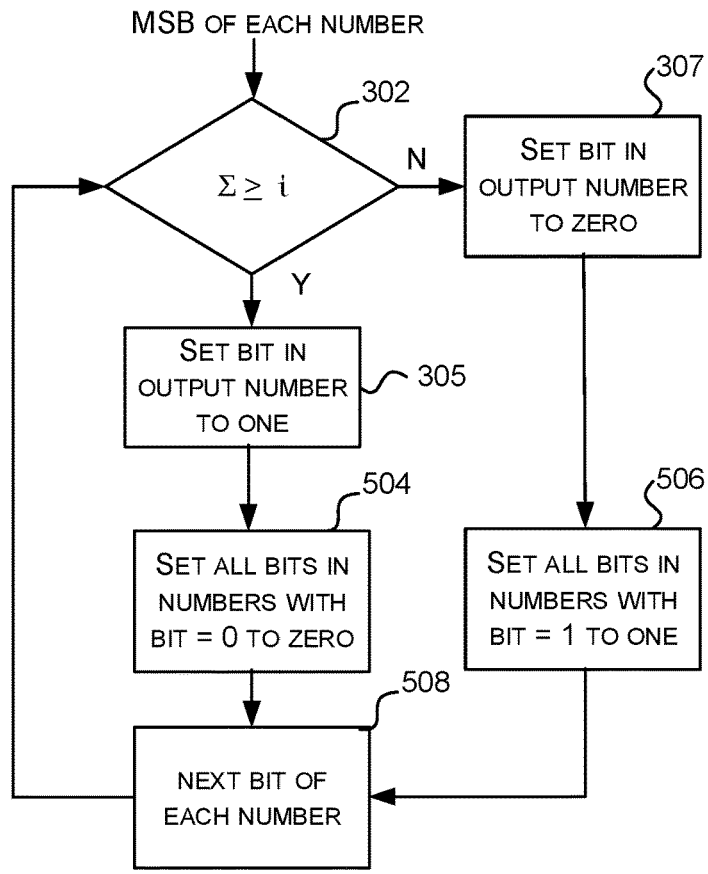
FIG. 5 is a flow diagram showing a second example method of calculating the $i^{th}$ largest number from the input set of n m-bit numbers.

FIG. 5 is a flow diagram of a second example method of calculating (or identifying) the $i^{th}$ largest number from the input set of n m-bit numbers. Like the first method, as described above and shown in FIG. 3A, the second method is also iterative; however, it does not use flags. Instead, based on the result of the summation (in block 302), the values of the numbers themselves are updated (blocks 504 and 506). In response to determining that the sum of the MSBs is greater than or equal to i ('Yes' in block 302), the MSB of the output number is set to one (block 305) and all the bits in those numbers with an MSB=0 are set to zero (block 504) and in response to determining that the sum of the MSBs is not greater than or equal to i ('No' in block 302), the MSB of the output number is set to zero (block 307) and the all the bits in those numbers with an MSB=1 are set to one (block 506).

The second iteration (j=m−2) starts by taking the next bit from each of the numbers (block 508), where some of these numbers may be the original numbers and others are the numbers that were modified in the first iteration (e.g. in block 504 or 506). The bits are summed and dependent upon the whether the sum is greater than or equal to i (in block 302), one or more of the remaining, original numbers may be set to all zeros (in block 504) or all ones (in block 506) and a further bit is added to the output number (in block 305 or 307).

The updating of the numbers (in blocks 504 and 506) can also be described by the following logic equations:

$$z_k[h] = y[j] \cdot (x_k[j] \cdot x_k[h]) + \overline{y[j]} \cdot (x_k[j] + x_k[h])$$

for h=0, 1, . . . , m−1.

The method of FIG. 5 may then be repeated for all m bits in the input numbers or, in various examples, there may be additional logic that identifies when a result has been obtained earlier (i.e. when there is only one distinct value left among the updated numbers $N_k$ which are not all ones or all zeros) and outputs the result at that stage (as described above). As noted above, this becomes more complex if there may be more than one number that is the $i^{th}$ biggest.

Figure 6:
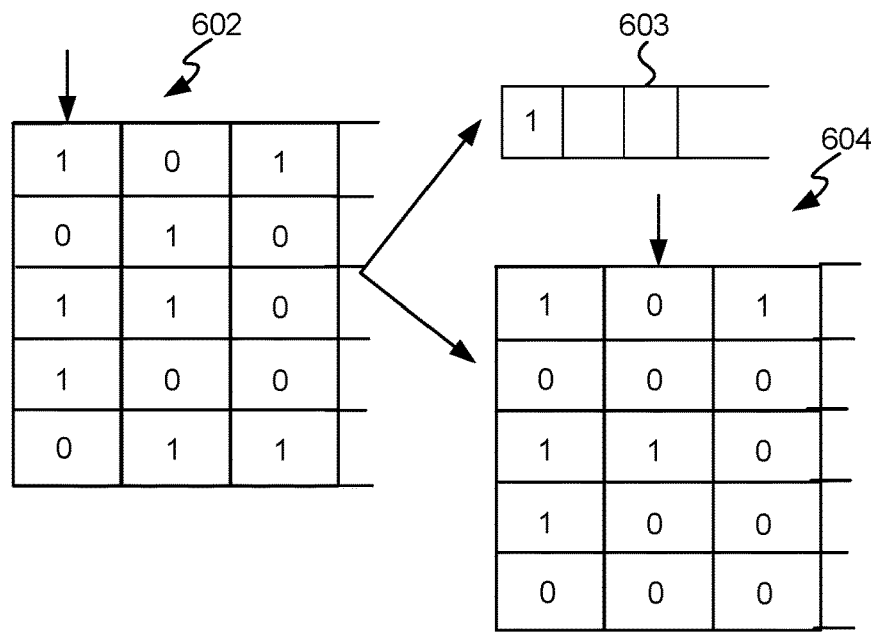
FIG. 6 illustrates an example of the operation of the method of FIG. 5.
Figure 6:
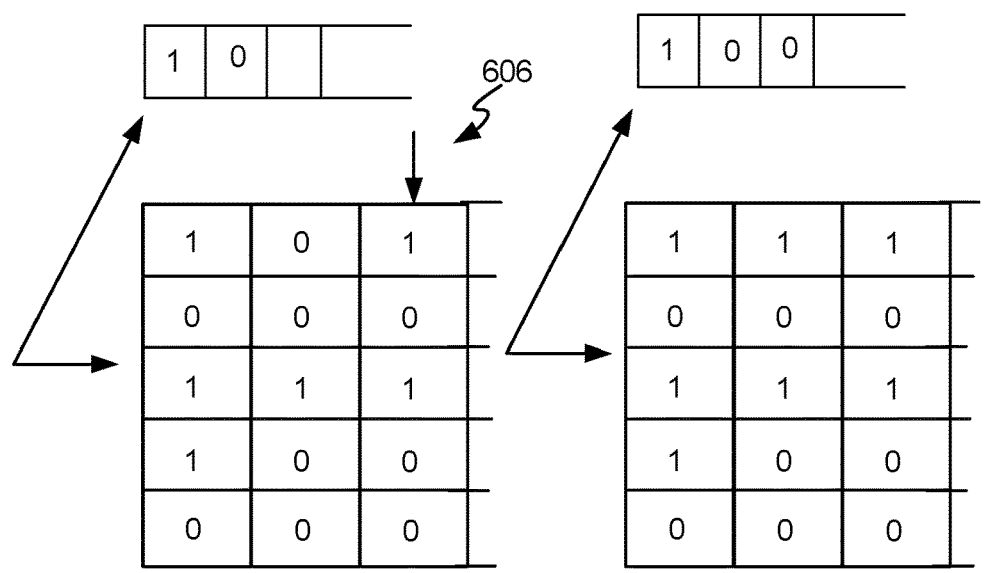

The method of FIG. 5 can be described with reference to the example shown in FIG. 6, where n=5 and i=3. In the first iteration 602, the MSBs of each number are summed and the result is 3. As the sum is equal to i ('Yes' in block 302), the MSB of the output number 603 is set to one (block 305) and those numbers where the MSB is zero are modified so that all their bits are equal to zero (block 504) and in the example shown numbers $N_1$ and $N_4$ are modified in this way.

In the second iteration 604, the next bits in each of the 5 numbers (original numbers $N_0$, $N_2$, $N_3$ and modified numbers $N_1$ and $N_4$) are summed and the result is 1. As the sum is less than i ('No' in block 302), the next most significant bit of the output number 603 is set to zero (block 307) and those numbers where the bit is one are modified so that all their bits are equal to one (block 506) and in the example shown number $N_2$ is modified in this way.

In the third iteration 606, the next bits in each of the 5 numbers (original numbers $N_0$ and $N_3$ and modified numbers $N_1$ $N_2$ and $N_4$) are summed and in this case the result is 2. As the sum is less than i ('No' in block 302), the next bit of the output number 603 is set to one (block 307) and those numbers where the bit is one have all their bits set equal to one (block 506) and in the example shown number No is modified in this way. At this point there is only one original number in the set (i.e. one number that is not all ones or all zeros), number $N_3$, and this is therefore the output number, i.e. the $i^{th}$ largest number from the input set. The method may stop at this point (e.g. if logic is provided to assess the flags and determine when only one original, unmodified number remains in the set) or the method may continue until all bits have been assessed and all bits of the output number generated (one bit per iteration).

Whilst FIG. 5 shows a first example method of calculating (or identifying) the $i^{th}$ largest number from the input set of n m-bit numbers, a very similar method may be used to calculate (or identify) the $p^{th}$ smallest number from the input set of n m-bit numbers. Like in the method of FIG. 3B, this involves changing the method of FIG. 5 only such that the summation is compared to the value of (n−p) or (n+1−p) rather than i (in block 302). Where (n−p) is used, if the sum of bits is strictly greater than (n−p), then the next bit in the output number is set to one and those numbers with a bit equal to zero are modified so that all the bits are equal to zero (block 504) and in response to determining that the sum is not greater than (n−p), the next bit in the output number is set to zero and those numbers with a bit equal to one are modified so that all the bits are equal to one (block 506). Alternatively, where (n+1−p) is used, if the sum of bits is greater than or equal to (n+1−p) then the next bit in the output number is set to one (block 305) and those numbers with a bit equal to zero are modified so that all the bits are equal to zero (block 504) and in response to determining that the sum is less than (n+1−p), the next bit in the output number is set to zero (block 307) and those numbers with a bit equal to one are modified so that all the bits are equal to one (block 506).

In another example method of calculating the $p^{th}$ smallest number from the input set of n m-bit numbers, all the input numbers $N_k$ may be bitwise inverted ($N_k \rightarrow \overline{N_k}$) and then the method of FIG. 5 may be used with i=p, so long as the final output is inverted back to its original form prior to being output.

Figure 7A:
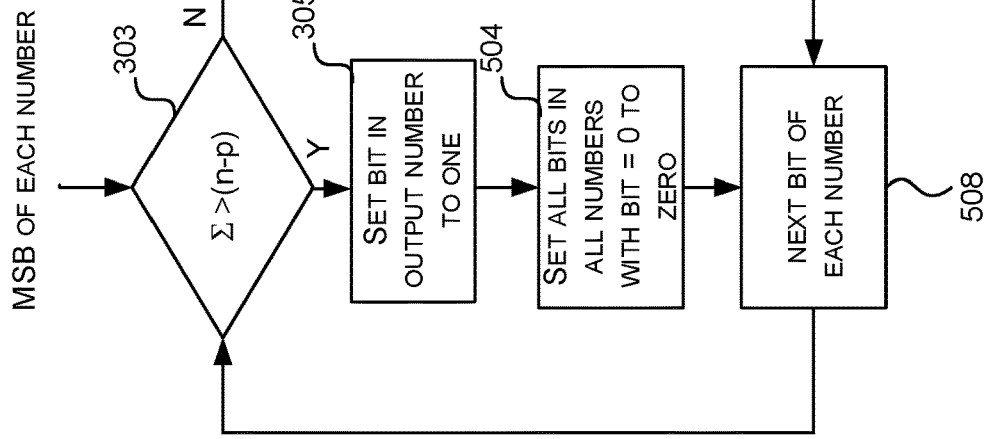
FIG. 7A is a flow diagram showing a third example method of calculating the $i^{th}$ largest number from the input set of n m-bit numbers.

FIG. 7A is a flow diagram of a third example method of calculating (or identifying) the $i^{th}$ largest number from the input set of n m-bit numbers. Like the first and second methods, as described above and shown in FIGS. 3A and 5, the third method is also iterative. Like the second method (shown in FIG. 5), the third method modifies numbers instead of using flags; however, instead of modifying some numbers to all zeros and others to all ones, all numbers are modified to be the same value (e.g. all zeros or all ones) and in the examples shown, all numbers are modified to be all zeros. In response to determining that the sum of the MSBs is greater than or equal to i ('Yes' in block 302), the next bit in the output number is set to one (block 305) and all the bits in those numbers with an MSB=0 are set to zero (block 504). In response to determining that the sum of the MSBs is not greater than or equal to i ('No' in block 302), the next bit in the output number is set to zero (block 307) and all the bits in those numbers with an MSB=1 are set to zero (block 706) and then, in order that the next iteration performs a correct comparison (in block 302), the value of i is then decremented by the total of the summation in that iteration (block 707).

The second iteration (j=m−2) starts by taking the next bit from each of the numbers (block 508), where some of these numbers may be the original numbers and others are the numbers that were modified (e.g. to be all zeros) in the first iteration. The bits are summed and dependent upon the whether the sum is greater than or equal to i (in block 302), the next bit in the output integer is set (in block 305 or 307) and different numbers from the remaining, original numbers may be set to all zeros (in block 504 or 706). Only if the sum was less than i ('No' in block 302), is the value of i is further decremented by the total of the summation in that iteration (block 707). The method of FIG. 7A may then be repeated for all m bits in the input numbers or, as described above, the method may be terminated when all except for one of the numbers in the input set have been modified (e.g. to all zeros) and this remaining number is then the output number.

The updating of the numbers (in blocks 504 and 706) can also be described by the following logic equations:

$$z_k[h] = \overline{(\overline{y[j]} \cdot \overline{x_k[j]}) + (y[j] \cdot x_k[j])} \cdot x_k[h]$$

for h=0, 1, . . . , m−1.

Figure 8:
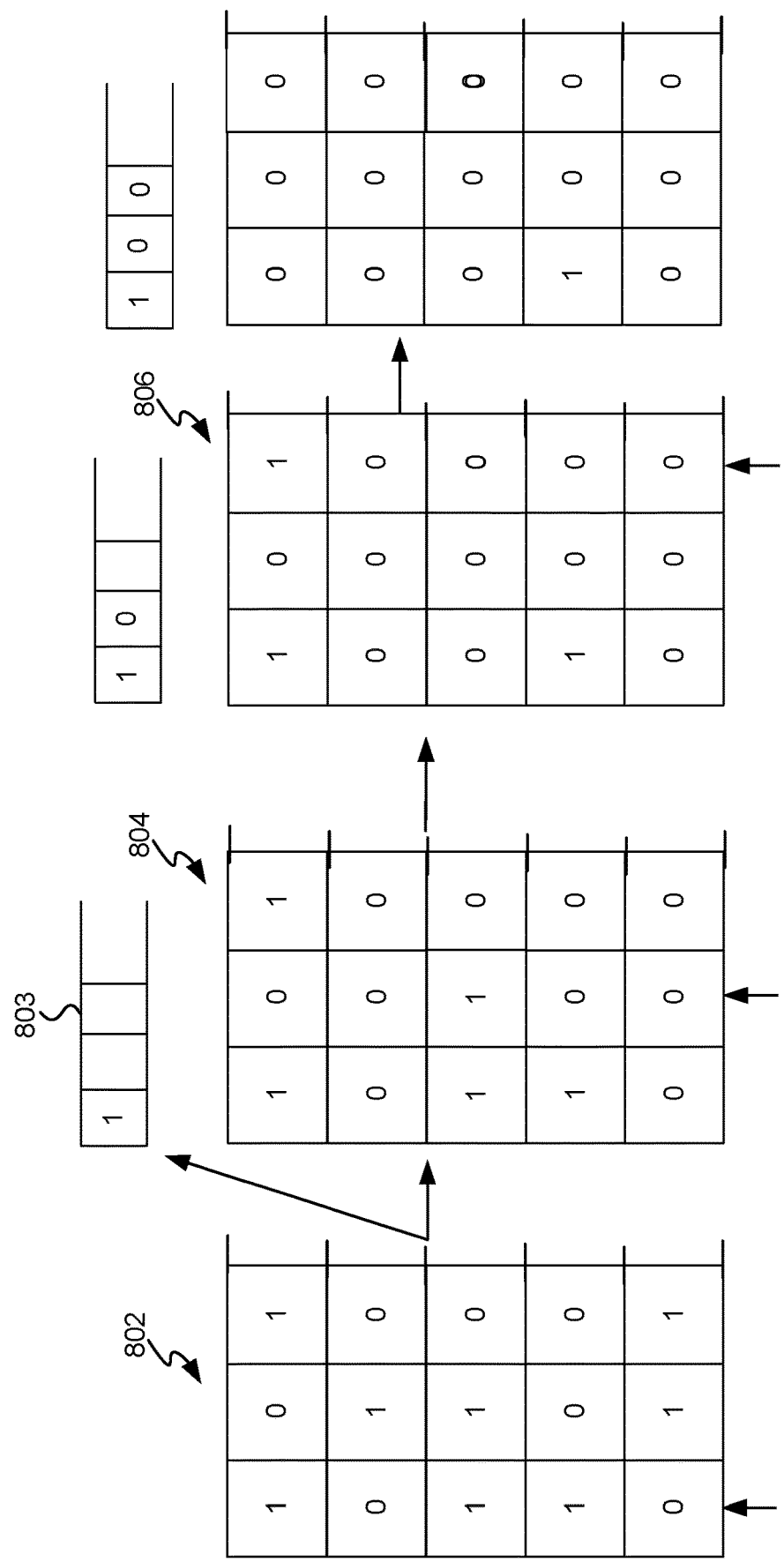
FIG. 8 illustrates an example of the operation of the method of FIG. 7A.

The method of FIG. 7A can be described with reference to the example shown in FIG. 8, where n=5 and i=3. In the first iteration 802, the MSBs of each number are summed and the result is 3. As the sum is equal to i ('Yes' in block 302), the MSB of the output number 803 is set to one (block 305) and those numbers where the MSB is zero are modified so that all their bits are equal to zero (block 504) and in the example shown numbers $N_1$ and $N_4$ are modified in this way.

In the second iteration 804, the next bits in each of the 5 numbers (original numbers $N_0$, $N_2$, $N_3$ and modified numbers $N_1$ and $N_4$) are summed and the result is 1. As the sum is less than i ('No' in block 302), the next bit in the output number is set to zero (block 307) and those numbers where the bit is one are modified so that all their bits are equal to zero (block 706) and in the example shown number $N_2$ is modified in this way. The value of i is then decremented by the result of the summation (i.e. by one) so that for the next iteration i=2.

In the third iteration 806, the next bits in each of the 5 numbers (original numbers $N_0$ and $N_3$ and modified numbers $N_1$ $N_2$ and $N_4$) are summed and in this case the result is 1. As the sum is less than i ('No' in block 302), the next bit in the output number is set to zero (block 307) and those numbers where the bit is one are modified so that all their bits are equal to zero (block 706) and in the example shown number $N_0$ is modified in this way. The value of i may be decremented again by the result of the summation (i.e. by one) so that i=1. At this point there is only one original number in the set, number $N_3$, and this is therefore the output number, i.e. the $i^{th}$ largest number from the input set. The method may stop at this point (e.g. if logic is provided to assess the flags and determine when only one original, unmodified number remains in the set) or the method may continue until all bits have been assessed.

Figure 7B:
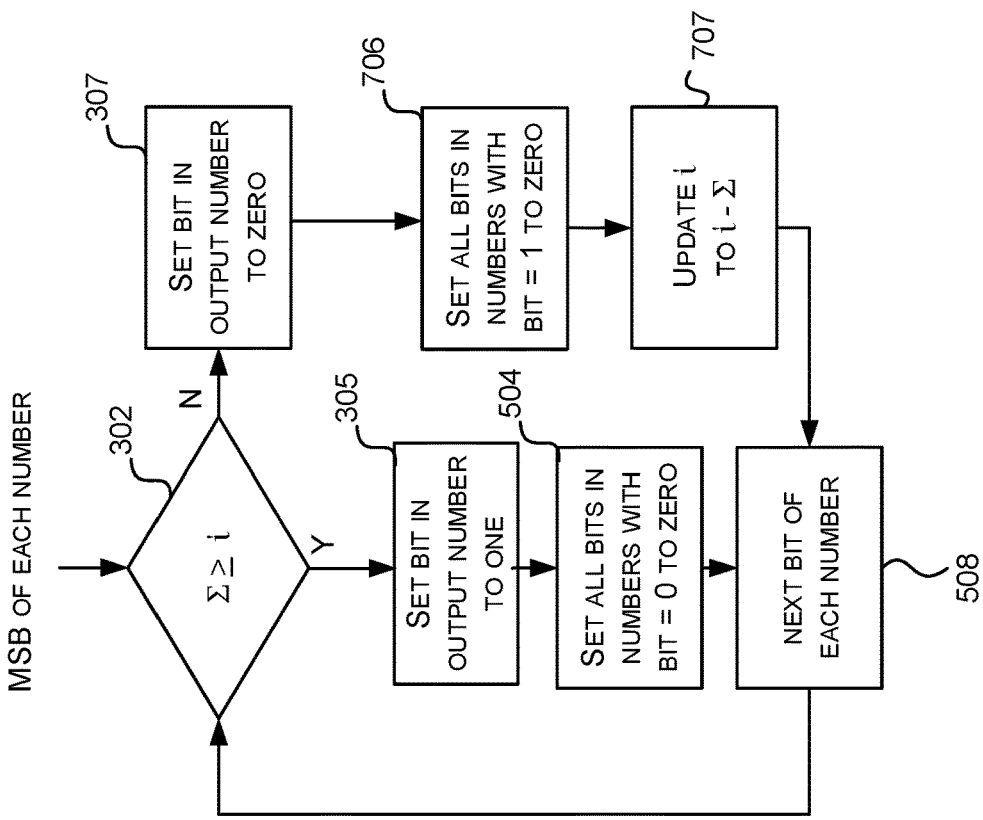
FIG. 7B is a flow diagram showing a further example method of calculating the $p^{th}$ smallest number from the input set of n m-bit numbers.

Whilst FIG. 7A shows a first example method of calculating (or identifying) the $i^{th}$ largest number from the input set of n m-bit numbers, a very similar method may be used to calculate (or identify) the $p^{th}$ smallest number from the input set of n m-bit numbers, as shown in FIG. 7B. As with FIG. 3B, whilst FIG. 7B shows a comparison, in block 303, of whether the sum is strictly greater than (n−p), in other examples the comparison may be whether the sum is greater than or equal to (n+1−p). In another example method of calculating the $p^{th}$ smallest number from the input set of n m-bit numbers, all the input numbers $N_k$ may be bitwise inverted ($N_k \rightarrow \overline{N_k}$) and then the method of FIG. 7A may be used with i=p, so long as the final output is inverted back to its original form prior to being output.

Figure 9:
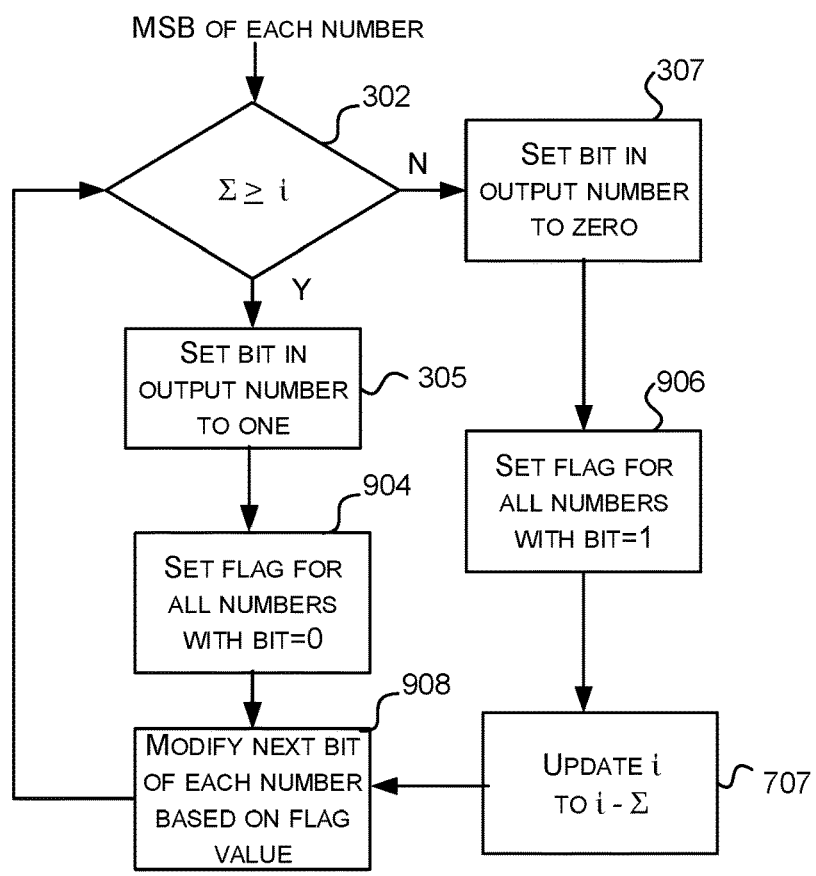
FIG. 9 is a flow diagram showing a fourth example method of calculating the $i^{th}$ largest number from the input set of n m-bit numbers.

FIG. 9 is a flow diagram of a fourth example method of calculating (or identifying) the $i^{th}$ largest number from the input set of n m-bit numbers. Like the first, second and third methods, as described above and shown in FIGS. 3A, 5 and 7A, the fourth method is also iterative. Like the first method (shown in FIG. 3A), the fourth method uses a flag; however, only a single flag is used. In response to determining that the sum of the MSBs is greater than or equal to i ('Yes' in block 302), the MSB of the output number is set to one (block 305) and the flag is set for those numbers with an MSB=0 (block 904). In response to determining that the sum of the MSBs is not greater than or equal to i ('No' in block 302), the MSB of the output number is set to zero (block 307) and the flag is set for those numbers with an MSB=1 (block 906) and then, in order that the next iteration performs a correct comparison (in block 302), the value of i is then decremented by the total of the summation in that iteration (block 707).

The second iteration (j=m−2) starts by taking the next bit from each of the numbers and modifying the bits using the flag values (block 908). If the flag is set for a number, then the bit is set to a predefined value, e.g. zero, irrespective of whether the bit value is actually a one or a zero. If the flag is not set, then the value of the bit is left unchanged.

The alteration of the bits (in block 908) can also be described by the following logic equation:

$$z_k[j] = x_k[j] \cdot \overline{\text{flag}_k[j+1]}$$

Figure 3I:
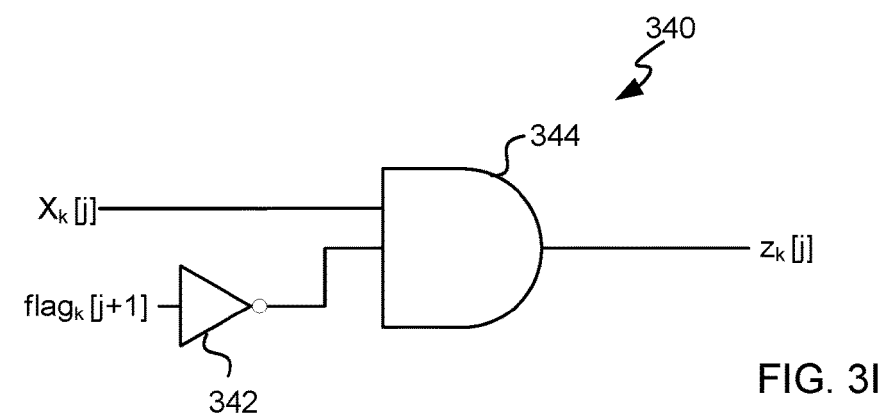
FIG. 3I shows a schematic diagram of an example hardware arrangement that implements an operation in the method of FIG. 9.

The corresponding hardware arrangement 340, which may be replicated n-times (one for each number in the set 200) is shown in FIG. 3I and comprises a NOT gate 342 and an AND gate 344, i.e. the current bit is combined with an inverted version of the current flag (as set in the previous iteration) in an AND gate.

The altered bits (as generated in block 908) are then summed and dependent upon the whether the sum is greater than or equal to i (in block 302), one or more further flags may be set (in block 904 or 906). If the predefined value is zero and the sum was less than i ('No' in block 302), the value of i is updated by decrementing the threshold value by the total of the summation in that iteration (block 707). Letting $i_j$ denote the threshold value, i, used in the comparison of the $j^{th}$ bits, this updating can be described by:

$$i_j = \begin{cases} i_{j+1} & \text{if } sum_{j+1} \geq i_{j+1} \\ i_{j+1} - sum_j & \text{if } sum_{j+1} < i_{j+1} \end{cases}.$$

In a variation of that shown in FIG. 9, if the predefined value is one (instead of zero) and the sum was greater than or equal to i ('Yes' in block 302), the value of i is updated by incrementing the threshold value by the number of rows which are changed this iteration, this will be the total number of inputs minus the total of the summation in that iteration (block 707) this updating can be described by:

$$i_j = \begin{cases} i_{j+1} & \text{if } sum_{j+1} < i_{j+1} \\ i_{j+1} + (n - sum_{j+1}) & \text{if } sum_{j+1} \geq i_{j+1} \end{cases}.$$

The method of FIG. 9 (or the variation of that method) may then be repeated for all m bits in the input numbers.

Whilst FIG. 9 shows a first example method of calculating (or identifying) the $i^{th}$ largest number from the input set of n m-bit numbers, a very similar method may be used to calculate (or identify) the $p^{th}$ smallest number from the input set of n m-bit numbers by changing the comparison performed (e.g. from block 302 to block 303 or to the modified version of block 303 described above, where the sum is compared to (n+1-p)) and the way in which the threshold is updated (e.g. from block 707 to block 717). In another example method of calculating the $p^{th}$ smallest number from the input set of n m-bit numbers, all the input numbers $N_k$ may be inverted ($N_k \rightarrow \overline{N_k}$) and then the method of FIG. 9 may be used with i=p, so long as the final output is inverted back to its original form.

In yet further variations, instead of using flags or updating the bits within the numbers, bits in a mask may be set in response to the comparison (e.g. in block 302) and then for subsequent iterations, the bits in the numbers may be combined (e.g. using AND gates) with the mask values. This has the same effect as the updating of the numbers (in the examples described above).

Synthesis experiments suggest that the use of two flags (as in the methods of FIGS. 3A and 3B) is more efficient in some circumstances than the other methods described herein in the sense that it requires smaller area of hardware logic to implement. In other circumstances the other methods described herein may be more efficient (e.g. the method of FIG. 5 may be more efficient if the cost of a register to store flags is more than the additional logic to update the bits in the input numbers and/or the methods of FIGS. 7A, 7B and 9 may be more efficient in circumstances where the logic that performs the updating of i or p can be made small).

Figure 10:
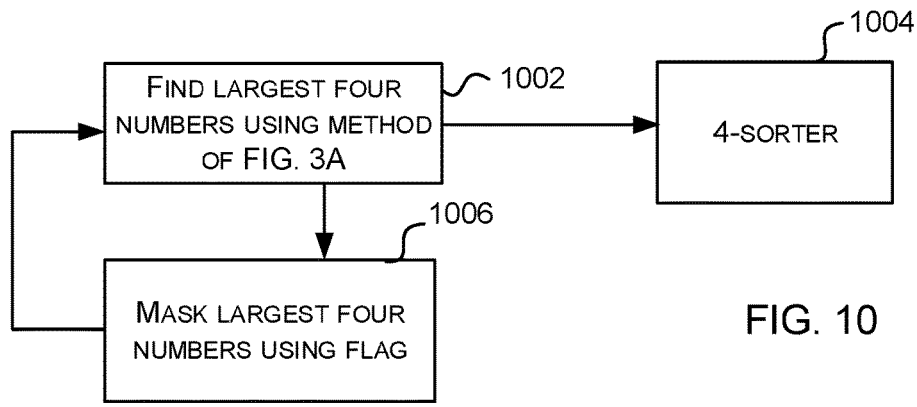
FIG. 10 is a schematic diagram showing the use of the method of FIG. 3A to perform sorting.

Furthermore, unlike the other methods described herein, the use of two flags (as in the methods of FIGS. 3A and 3B) enables the identification of two subsets of the set of numbers 200. Having determined the $i^{th}$ largest number or the $p^{th}$ smallest number from the input set of n m-bit numbers, the maximum flags may be used to identify all numbers within the set that are larger than the output number and the minimum flags may be used to identify all numbers within the set that are smaller than the output number. This may then be used iteratively to implement a sorting operation and an example of a 4T-sorter which works when each of the $N_k$ are unique is shown in FIG. 10, where T is an integer. As shown in FIG. 10, the input set comprises 4T input numbers (n=4T), the method of FIG. 3A is then used (in block 1002) to find the largest four numbers in the input set (e.g. by setting i=4). The largest four numbers from the input set are then input to a 4 sorter (block 1004). These largest four numbers are also masked from the input set using a flag, e.g. the min_flag (block 1006) and the masked input set are then input to a second iteration of the method of FIG. 3A (block 1002). Alternatively, the masking may use the max_flag and in such an implementation, the value of i that is used in subsequent iterations of block 1002 increases by four for each iteration. In this case an additional flag would be required for each number to keep track of which numbers had previously been passed to the 4 sorter. Such a sorting arrangement can be implemented in a small area of hardware logic because of its iterative nature and because the 4-sorter can be implemented in a very small area of hardware logic. In further examples, a sorting operation may be implemented by only using the methods of FIGS. 3A and/or 3B.

If the inputs $N_k$ to the method of FIG. 10 were not known to be unique then there are extra complications. For example if five inputs were the same value it would not be possible to pass these five values to the 4 sorter. A solution, in the case where the min_flag is being set, is to count how many outputs are sent and if this value is greater than 4 ignore the output and set the value of i to 1 for the next iteration. This way all outputs from this next iteration will have the same value and these values could bypass the 4 sorter. The min_flag on these inputs would be set and the value of i would be set to 4 again for the next iteration. This extra logic will cost area to implement in hardware and reduce throughput of the system.

FIG. 12A is a schematic diagram of a hardware logic unit 1230 arranged to implement the methods described above (i.e. to select an $i^{th}$ largest or $p^{th}$ smallest number from a set of n m-bit numbers). As shown in FIG. 12A, the hardware logic unit 1230 comprises a summation logic unit 1232, a comparison logic unit 1234 and an updating logic unit 1236. The hardware logic unit 1230 also comprises an output 1238 and may comprise an input (not shown in FIG. 12A) for receiving the set of n m-bit numbers. As described above, the summation logic unit 1232 is arranged to sum a bit from each of the m-bit numbers to generate a summation result, wherein all the bits being summed occupy an identical bit position within their respective number and an example implementation is shown in FIG. 3F and described above. The comparison logic unit 1234 is arranged to compare the summation result generated by the summation logic in that iteration to a threshold value and set a bit of the selected number based on an outcome of the comparison. The updating logic unit 1236 is arranged, for each of the m-bit numbers, to selectively update a bit in the m-bit number occupying a next bit position based on the outcome of the comparison in that iteration and a value of the bit from the m-bit number and example implementations are shown in FIGS. 3D and 3I and described above. The term 'selectively update' refers to the fact that the updating logic may not necessarily change the values of any bits when performing an update.

As shown in FIG. 12A and described above, the hardware logic unit 1230 may additionally comprise a flag control logic unit 1235 and/or an early exit logic unit 1237. The flag control logic unit 1235 is arranged to selectively set a flag associated with the m-bit number based on the outcome of the comparison and a value of the bit from the m-bit number (where the term 'selectively' is used as described above, to indicate that a flag value may be changed or left unchanged in any iteration) and two example implementations of the flag control logic unit 1235 are shown in FIGS. 3G and 3H and described above. The early exit logic unit 1237 is arranged to determine when a result has been obtained before all m iterations are complete and then output the result (or the data identifying the result) at that stage. This determination by the early exit logic unit 1237 may be made based on analysis of flag values and/or the output from the updating logic unit 1236 (i.e. by determining that all except one of the m-bit numbers has had all of its bit values updated to a predefined value).

Figure 11A:
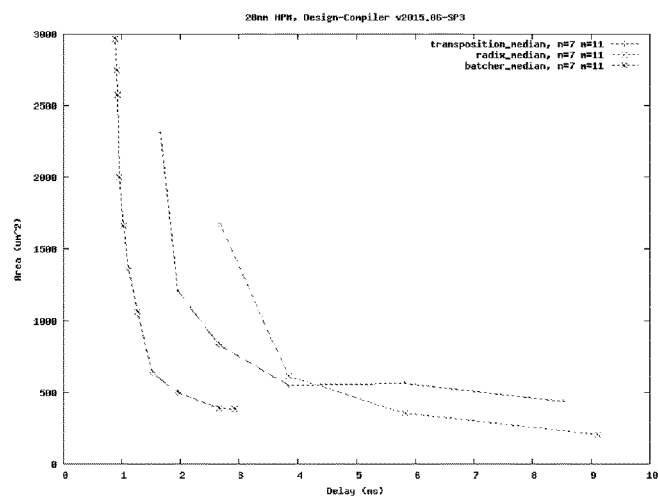
FIGS. 11A, 11B and 11C are graphs showing synthesis results for the methods described herein.
Figure 11B:
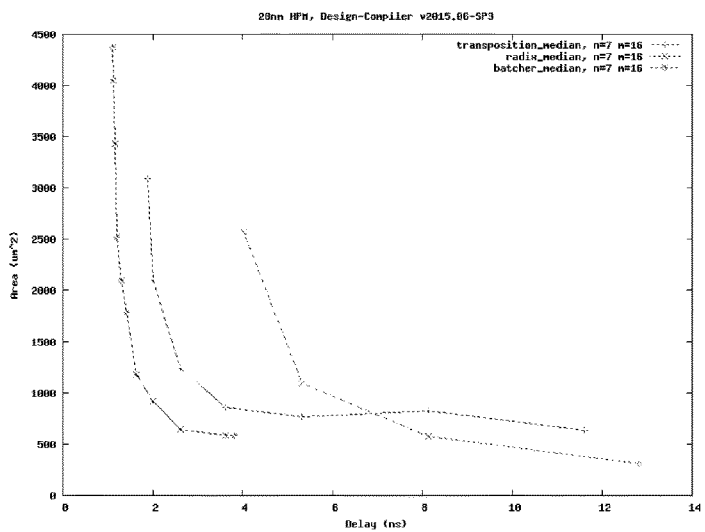
Figure 11C:
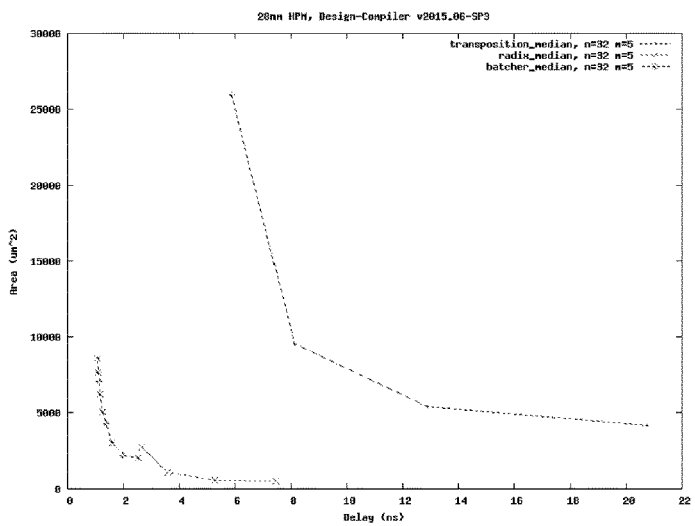

FIGS. 11A-11C show three example area-delay graphs for hardware that implements the methods described herein to find the median of a set of input numbers (the curve labelled 'radix_median' in the graphs). In such examples, $$i = \left\lfloor \frac{n+1}{2} \right\rfloor$$

And the hardware is arranged to find the $i^{th}$ largest item in a list of size n of Um values (i.e. unsigned m-bit numbers). In the graph shown in FIG. 11A, n=7 and m=16, in the graph shown in FIG. 11B, n=7 and m=11 and in the graph shown in FIG. 11C, n=32 and m=5. As shown in the graphs, the hardware can be made smaller than alternative hardware (e.g. the 'transposition_median' hardware that uses a bubble sort network with only the median output connected and the 'batcher_median' hardware that comprises a batcher odd-even merge sort network) but this smaller hardware is typically slower (i.e. it involves a larger delay).

Although the methods are described herein with a single bit being assessed in each iteration, in other examples, more than one bit (e.g. bit pairs) may be assessed in each iteration. This increases the size of the hardware that implements the method but increases the throughput of the hardware.

In the examples described above, there are n numbers in the input set and the number sorting hardware logic unit is arranged to identify the $i^{th}$ largest or $p^{th}$ smallest number from that input set. In some examples, however, there may be fewer than n numbers in the input set, e.g. n' numbers in the input set. In such examples, where flags are used (e.g. in the methods of FIGS. 3A and 3B), pre-masking may be used such that the initial values of some of the flags may be set (e.g. set to one, rather than zero). In the event that the $i^{th}$ largest number is to be identified using the method of FIG. 3A, the n' numbers are positioned at the start of the set (as numbers $N_0$ to $N_{n'-1}$) and it is the last (n-n') flags that are set, i.e. the flags for numbers $N_{n'}$ to $N_{n-1}$. In contrast, if the $p^{th}$ smallest number is to be identified using the method of FIG. 3B, the n' numbers are positioned at the end of the set (as numbers $N_{n-n'}$ to $N_{n-1}$) and it is the first (n-n') flags that are set, i.e. the flags for numbers $N_0$ to $N_{n'-n-1}$. Pre-masking may similarly be applied to the flags in the method of FIG. 9. Additionally, where the other methods are used that do not use flags (e.g. as shown in FIGS. 5, 7A and 7B), instead of using pre-masking, the input set of n' numbers may be padded by the addition of n-n' dummy input numbers, with the bits of these dummy input numbers being either all 0s where the hardware is configured to identify $i^{th}$ largest number or all 1s where the hardware is configured to identify the $p^{th}$ smallest number.

In the examples described above, each of the input numbers $N_k$ are m-bit numbers, where m is fixed and is the same for all input numbers in the set. In other examples, whilst, the input numbers may each comprise m-bits if fully generated, not all m-bits (of some or all of the input numbers) may be available (i.e. generated) in a particular iteration. Any of the methods described above may be modified to operate on such input numbers which may be generated by any MSB-first iterative process (such as CORDIC or Online Arithmetic) and in such examples, the index, j, represents the bit index assuming all m-bits have been generated. As noted above, j=m-r in examples in which one bit position is considered per iteration.

In such examples, the additional logic (as described above) may, for example, be used to halt an MSB-first iterative process for generating a particular input number once it is clear that the number the process is generating will not be the $i^{th}$ largest (or $p^{th}$ smallest, depending upon the implementation). It is therefore useful to determine this at any early stage and avoid unnecessary computation and hence save power.

In various examples, it may be that the numbers $N_k$ are values with no finite binary representation in the standard fixed point format (such as ⅓ or the square root of 2) which are being generated 1-bit at a time (and hence, whilst m is an integer, the value of m is not fixed but increases in value as more bits are generated). Using the additional logic, the $i^{th}$ largest (or $p^{th}$ smallest, depending upon the implementation) of these numbers may be able to be found by looking at the top $r_{max}$-bits, and then the methods described herein would be able to indicate which of the inputs is the $i^{th}$ largest (or $p^{th}$ smallest, depending upon the implementation) and stop the calculations after $r_{max}$ iterations (e.g. where $r_{max}$=100). Alternatively, whilst the output value may not definitely be the $i^{th}$ largest (or $p^{th}$ smallest, depending upon the implementation), the value of $r_{max}$ may be set that the output number has a high probability of being the $i^{th}$ largest (or $p^{th}$ smallest, depending upon the implementation). In a variation on this, there may be various check points implemented (e.g. various values of $r_{max}$) and a decision may be made at each check point in turn until the output number can be identified, without performing this decision at each iteration.

Figure 14:
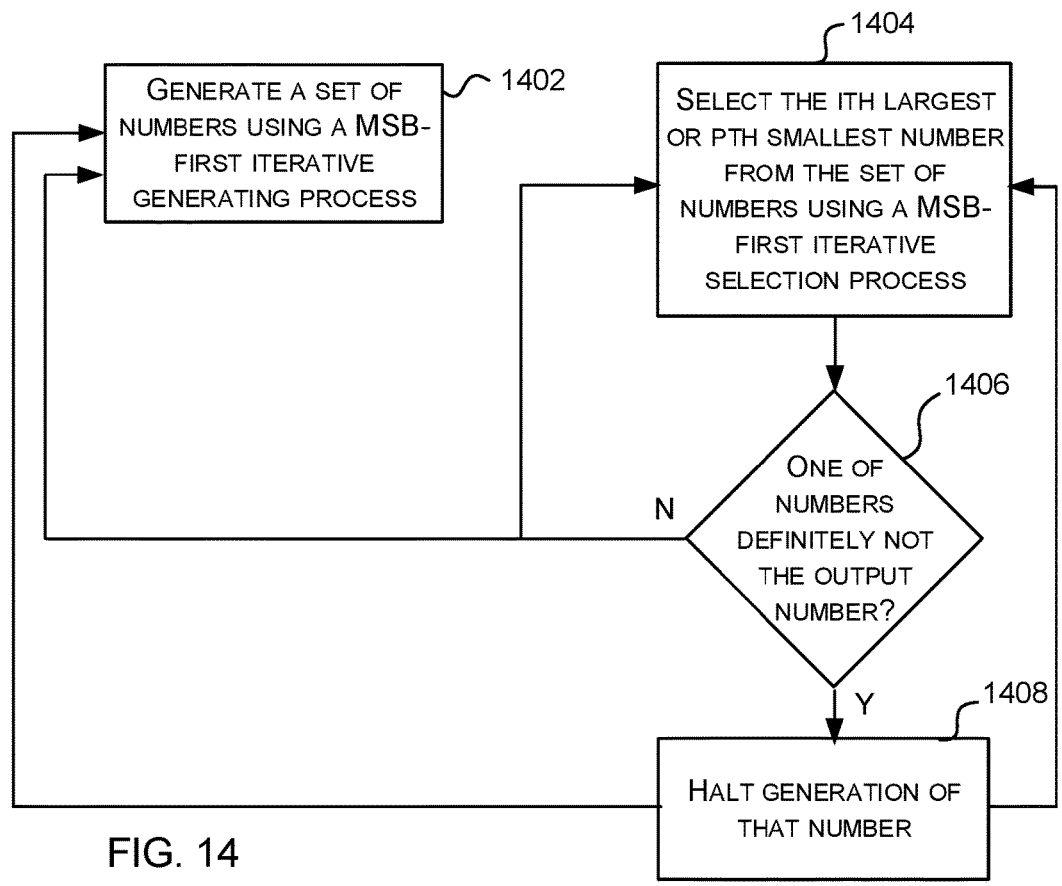
FIG. 14 is a flow diagram of an example method of generating and selecting a number from a set of n numbers that are generated iteratively, starting with the MSB.

FIG. 14 is a flow diagram of an example method of generating and selecting a number from a set of n numbers that are generated iteratively, starting with the MSB. Such a process is referred to as an MSB-first iterative generative process. As shown in FIG. 14, the set of n numbers are generated using a MSB-first iterative generative process (block 1402) concurrently with a selection process (block 1404). The selection process (in block 1404) selects either an $i^{th}$ largest or a $p^{th}$ smallest number from the set of n numbers using the methods described above and such methods may be described as a MSB-first iterative selection process. The method further comprises, in response to the MSB-first iterative selection process determining that a particular one of the numbers of said set of n numbers will not be the selected number ('Yes' in block 1406), halting the generation of said particular number by said MSB-first iterative generating process after at least one of the bits of said particular number has been generated and before all of the bits of said particular number have been generated (block 1408). The method continues until the selection process (in block 1404) selects the $i^{th}$ largest or a $p^{th}$ smallest number from the set of n numbers and then, as described above, data indicative of the selected number is output.

FIG. 12B is a schematic diagram of a processing unit 1240 arranged to generate and select a number. The processing unit 1240 comprises a generation logic unit 1242, a selection logic unit 1244 and an output 1246. The generation logic unit 1242 is arranged to perform a MSB-first iterative generating process for generating a set of n numbers. The selection logic unit 1244 is arranged to operate concurrently with the generation logic unit 1242. The selection logic unit 1244 is arranged to perform a MSB-first iterative selection process to select either an $i^{th}$ largest or a $p^{th}$ smallest number from the set of n numbers and consequently, the selection logic unit 1244 may comprise some or all of the elements of the hardware logic unit 1230 shown in FIG. 12A and described above. The output 1246 is arranged to output data indicative of the selected number. The processing unit 1240 is further arranged in response to the selection logic unit 1244 determining that a particular one of the numbers of said set of n numbers will not be the selected number, to trigger (or otherwise cause) the generation logic unit 1242 to halt the generation of that particular number. In this way, the generation (by the MSB-first iterative generating process) is stopped for one or more of the numbers after at least one bit of each number has been generated and before all of the bits of the one or more numbers have been generated.

In some of the examples described above and shown in the drawings, the use of specific logic gates (e.g. NOT, AND, OR gates) is described. It will be appreciated that in other examples, any arrangement of hardware logic that implements the same functionality (e.g. as a NOT, AND or OR gates) may be used instead of a single logic gate and these may be referred to as logic blocks (e.g. NOT, AND and OR logic blocks).

The methods described above may be implemented in hardware (e.g. within a number sorting hardware logic unit) or software. FIG. 12C shows a computer system in which the methods described herein may be implemented, e.g. within the central processing unit (CPU) 1202 or graphics processing unit (GPU) 1204. As shown in FIG. 12C, the computer system further comprises a memory 1206 and other devices 1214, such as a display 1216, speakers 1218 and a camera 1220. The components of the computer system can communicate with each other via a communications bus 1222.

The methods described herein may be embodied in hardware on an integrated circuit, e.g. within a number sorting hardware logic unit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture hardware logic configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, a processor comprising hardware logic configured to perform one of the methods as described herein. Furthermore, there may be provided an integrated circuit definition dataset that, when processed in an integrated circuit manufacturing system, causes the method of manufacturing processor comprising the hardware logic to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS(RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor comprising hardware logic configured to perform one of the methods as described herein will now be described with respect to FIG. 13.

Figure 13:
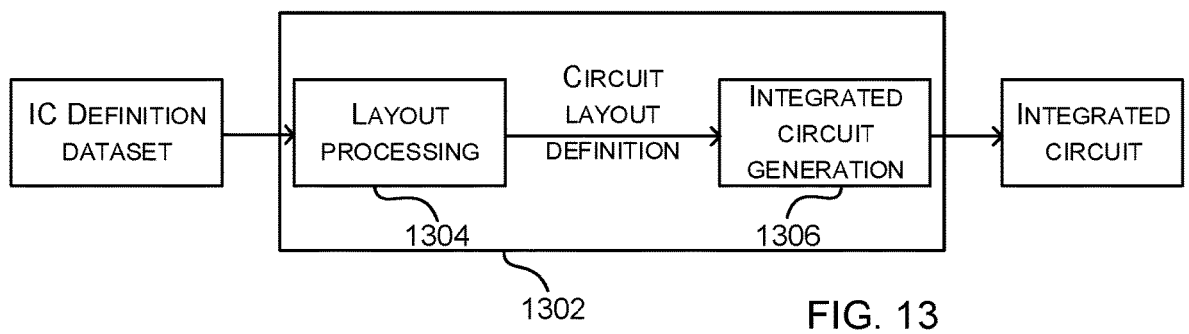
FIG. 13 shows an integrated circuit manufacturing system for generating an integrated circuit embodying a graphics processing system.

FIG. 13 shows an example of an integrated circuit (IC) manufacturing system 1302 which is configured to manufacture a number sorting hardware logic unit and/or a processor comprising hardware logic configured to perform one of the methods as described herein. In particular, the IC manufacturing system 1302 comprises a layout processing system 1304 and an integrated circuit generation system 1306. The IC manufacturing system 1302 is configured to receive an IC definition dataset (e.g. defining a processor comprising hardware logic configured to perform one of the methods as described herein), process the IC definition dataset, and generate an IC according to the IC definition dataset (e.g. which embodies an number sorting hardware logic unit and/or a processor comprising hardware logic configured to perform one of the methods as described herein). The processing of the IC definition dataset configures the IC manufacturing system 1302 to manufacture an integrated circuit embodying a processor comprising hardware logic configured to perform one of the methods as described herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor comprising hardware logic configured to perform one of the methods as described herein without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

A first further example provides a method of selecting, in hardware logic, a number from a set of n m-bit numbers, wherein the selected number is either an $i^{th}$ largest or a $p^{th}$ smallest number from the set of n m-bit numbers, where i, p, m and n are integers, the method comprising a plurality of iterations and each of the iterations comprising: summing a bit from each of the m-bit numbers to generate a summation result, wherein all the bits being summed occupy an identical bit position within their respective number; comparing the summation result to a threshold value, wherein the threshold value is calculated based on i or p; setting, based on an outcome of the comparison, a bit of the selected number; and for each of the m-bit numbers, based on the outcome of the comparison and a value of the bit from the m-bit number, selectively updating a bit in the m-bit number occupying a next bit position, wherein in a first iteration, a most significant bit from each of the m-bit numbers is summed and a most significant bit of the selected number is set and each subsequent iteration sums bits occupying successive bit positions in their respective numbers and sets a next bit of the selected number, and wherein the method comprises outputting data indicative of the selected number.

Outputting data indicative of the selected number may comprise either: outputting the selected number; or outputting an indication of the position, within the n m-bit numbers, of the selected number.

Setting, based on an outcome of the comparison, a bit of the selected number may comprise: in response to determining that the summation result exceeds the threshold value, setting the bit of the selected number to one; and in response to determining that the summation result is less than the threshold value, setting the bit of the selected number to zero.

In a $r^{th}$ iteration, summing a bit from each of the m-bit numbers to generate a summation result, may comprise summing a bit having a bit index m-r from each of the m-bit numbers to generate a summation result, wherein each bit is either an original bit from one of the m-bit numbers or an updated bit from a previous iteration.

The selected number may be the $i^{th}$ largest number from the set of n m-bit numbers and the threshold value may be equal to i. In other examples, the selected number may be the $p^{th}$ smallest number from the set of n m-bit numbers and the threshold value is equal to (n–p) or (n–p+1).

Selectively updating a bit in the m-bit number occupying a next bit position based on the outcome of the comparison and a value of the bit from the m-bit number may comprise: selectively setting a flag associated with the m-bit number based on the outcome of the comparison and a value of the bit from the m-bit number; and selectively updating a bit in the m-bit number occupying a next bit position based on values of one or more flags associated with the m-bit number.

Selectively setting a flag associated with the m-bit number based on the outcome of the comparison and a value of the bit from the m-bit number may comprise: in response to determining that the summation result exceeds the threshold value and that the value of the bit is zero, setting a min flag associated with the m-bit number; and in response to determining that the summation result is less than the threshold value and that the value of the bit is one, setting a max flag associated with the m-bit number, and wherein selectively updating a bit in the m-bit number occupying a next bit position based on values of one or more flags associated with the m-bit number comprises: in response to determining that the max flag associated with the m-bit number is set, setting the bit in the m-bit number occupying the next bit position to one; in response to determining that the min flag associated with the m-bit number is set, setting the bit in the m-bit number occupying the next bit position to zero; and in response to determining that neither the max flag nor the min flag associated with the m-bit number is set, leaving the bit in the m-bit number occupying the next bit position unchanged.

Selectively setting a flag associated with the m-bit number based on the outcome of the comparison and a value of the bit from the m-bit number may comprise: in response to determining that the summation result exceeds the threshold value and that the value of the bit is zero, setting a particular flag associated with the m-bit number; and in response to determining that the summation result is less than the threshold value and that the value of the bit is one, setting the particular flag associated with the m-bit number and updating the threshold value by an amount equal to the summation result, and wherein selectively updating a bit in the m-bit number occupying a next bit position based on values of one or more flags associated with the m-bit number comprises: in response to determining that the particular flag is set, setting the bit in the m-bit number occupying the next bit position to a predefined value; and in response to determining that the particular flag associated with the m-bit number is not set, leaving the bit in the m-bit number occupying the next bit position unchanged. The predefined value may be zero.

Selectively setting a flag associated with the m-bit number based on the outcome of the comparison and a value of the bit from the m-bit number may comprise: in response to determining that the summation result exceeds the threshold value and that the value of the bit is zero, setting a particular flag associated with the m-bit number and updating the threshold value by an amount equal to n minus the summation result; and in response to determining that the summation result is less than the threshold value and that the value of the bit is one, setting the particular flag associated with the m-bit number, and wherein selectively updating a bit in the m-bit number occupying a next bit position based on values of one or more flags associated with the m-bit number comprises: in response to determining that the particular flag is set, setting the bit in the m-bit number occupying the next bit position to a predefined value; and in response to determining that the particular flag associated with the m-bit number is not set, leaving the bit in the m-bit number occupying the next bit position unchanged. The predefined value may be one.

The method may further comprise: determining how many of the m-bit numbers have an associated flag that is set; and in response to determining that n–1 of the m-bit numbers have an associated flag set, outputting data indicative of the m-bit number without an associated flag set.

Selectively updating a bit in the m-bit number occupying a next bit position based on the outcome of the comparison and a value of the bit from the m-bit number may comprise: in response to determining that the summation result exceeds the threshold value and that the value of the bit is zero, updating all bits in the m-bit number to zero; and in response to determining that the summation result does not exceed the threshold value and that the value of the bit is one, updating all bits in the m-bit number to one.

Selectively updating a bit in the m-bit number occupying a next bit position based on the outcome of the comparison and a value of the bit from the m-bit number may comprise: in response to determining that the summation result exceeds the threshold value and that the value of the bit is zero, updating all bits in the m-bit number to zero; and in response to determining that the summation result does not exceed the threshold value and that the value of the bit is one, updating all bits in the m-bit number to zero and reducing the threshold value by an amount equal to the summation result.

The method may comprise m iterations and in the $m^{th}$ iteration, a least significant bit from each of the m-bit numbers is summed and a least significant bit of the selected number is set.

A second further example provides a hardware logic unit arranged to select an $i^{th}$ largest or $p^{th}$ smallest number from a set of n m-bit numbers, where i, p, m and n are integers, the hardware logic unit being arranged to operate iteratively and comprising: summation logic arranged to, in each iteration, sum a bit from each of the m-bit numbers to generate a summation result, wherein all the bits being summed occupy an identical bit position within their respective number such that in a first iteration, a most significant bit from each of the m-bit numbers is summed and each subsequent iteration sums bits occupying successive bit positions in their respective numbers; comparison logic arranged to, in each iteration, compare the summation result generated by the summation logic in that iteration to a threshold value and set a bit of the selected number based on an outcome of the comparison, wherein the threshold value is calculated based on i or p; updating logic arranged to, in each iteration and for each of the m-bit numbers, selectively update a bit in the m-bit number occupying a next bit position based on the outcome of the comparison in that iteration and a value of the bit from the m-bit number; and an output arranged to output data indicative of the selected number.

The hardware logic unit may further comprise: flag control logic arranged to selectively set a flag associated with the m-bit number based on the outcome of the comparison and a value of the bit from the m-bit number; and wherein the updating logic is arranged to selectively update a bit in the m-bit number occupying a next bit position based on values of one or more flags associated with the m-bit number.

The flag control logic may comprise: a min flag logic block arranged to, in response to determining that the summation result exceeds the threshold value and that the value of the bit is zero, set a min flag associated with the m-bit number; and a max flag logic block arranged to, in response to determining that the summation result is less than the threshold value and that the value of the bit is one, set a max flag associated with the m-bit number, and wherein the updating logic is arranged to: in response to determining that the max flag associated with the m-bit number is set, set the bit in the m-bit number occupying the next bit position to one; in response to determining that the min flag associated with the m-bit number is set, set the bit in the m-bit number occupying the next bit position to zero; and in response to determining that neither the max flag nor the min flag associated with the m-bit number is set, leave the bit in the m-bit number occupying the next bit position unchanged.

The flag control logic may be arranged to: in response to determining that the summation result exceeds the threshold value and that the value of the bit is zero, set a particular flag associated with the m-bit number; and in response to determining that the summation result is less than the threshold value and that the value of the bit is one, set the particular flag associated with the m-bit number and updating the threshold value by an amount equal to the summation result, and wherein the updating logic is arranged to: in response to determining that the particular flag is set, set the bit in the m-bit number occupying the next bit position to a predefined value; and in response to determining that the particular flag is not set, leave the bit in the m-bit number occupying the next bit position unchanged. The predefined value may be zero.

The flag control logic may be arranged to: in response to determining that the summation result exceeds the threshold value and that the value of the bit is zero, set a particular flag associated with the m-bit number and updating the threshold value by an amount equal to n minus the summation result; and in response to determining that the summation result is less than the threshold value and that the value of the bit is one, set the particular flag associated with the m-bit number, and wherein the updating logic is arranged to: in response to determining that the particular flag is set, set the bit in the m-bit number occupying the next bit position to a predefined value; and in response to determining that the particular flag is not set, leave the bit in the m-bit number occupying the next bit position unchanged. The predefined value may be one.

The hardware logic unit may further comprise: an early exit hardware logic block arranged to determine how many of the m-bit numbers have an associated flag that is set; and in response to determining that n−1 of the m-bit numbers have an associated flag set, to output the m-bit number without an associated flag set as the selected number.

The updating logic may be arranged to: in response to determining that the summation result exceeds the threshold value and that the value of the bit is zero, update all bits in the m-bit number to zero; and in response to determining that the summation result does not exceed the threshold value and that the value of the bit is one, update all bits in the m-bit number to one.

The updating logic may be arranged to: in response to determining that the summation result exceeds the threshold value and that the value of the bit is zero, update all bits in the m-bit number to zero; and in response to determining that the summation result does not exceed the threshold value and that the value of the bit is one, update all bits in the m-bit number to zero and reduce the threshold value by an amount equal to the summation result.

A third further example provides a hardware logic unit configured to perform the method described above.

A fourth further example provides a method of manufacturing, using an integrated circuit manufacturing system, a hardware logic unit as detailed above.

A fifth further example provides an integrated circuit definition dataset that, when processed in an integrated circuit manufacturing system, configures the integrated circuit manufacturing system to manufacture a hardware logic unit as detailed above.

A sixth further example provides a computer readable storage medium having stored thereon a computer readable description of an integrated circuit that, when processed in an integrated circuit manufacturing system, causes the integrated circuit manufacturing system to manufacture a hardware logic unit as detailed above.

A seventh further example provides an integrated circuit manufacturing system comprising: a computer readable storage medium having stored thereon a computer readable description of an integrated circuit that describes a hardware logic unit as detailed above; a layout processing system configured to process the integrated circuit description so as to generate a circuit layout description of an integrated circuit embodying the hardware logic unit; and an integrated circuit generation system configured to manufacture the hardware logic unit according to the circuit layout description.

An eighth further example provides a method, implemented in hardware logic, for generating and selecting a number, the method comprising: performing a MSB-first (most significant bit first) iterative generating process for generating a set of n numbers; concurrently with performing the MSB-first iterative generating process for generating the set of n numbers, performing a MSB-first iterative selection process to select either an $i^{th}$ largest or a $p^{th}$ smallest number from the set of n numbers, where i, p and n are integers; and in response to the MSB-first iterative selection process determining that a particular one of the numbers of said set of n numbers will not be the selected number, halting the generation of said particular number by said MSB-first iterative generating process after at least one of the bits of said particular number has been generated and before all of the bits of said particular number have been generated, wherein the method comprises outputting data indicative of the selected number.

The MSB-first iterative generating process may be a CORDIC (Coordinate Rotation Digital Computer) process or an Online Arithmetic process.

Performing the MSB-first iterative selection process may comprise performing a plurality of iterations, wherein each of the iterations may comprise: summing a bit from each of the numbers of the set to generate a summation result, wherein all the bits being summed occupy an identical bit position within their respective number; comparing the summation result to a threshold value, wherein the threshold value is calculated based on i or p; setting, based on an outcome of the comparison, a bit of the selected number; and for each of the numbers of the set, based on the outcome of the comparison and a value of the bit from the number, selectively updating a bit in the number occupying a next bit position. In a first iteration, a most significant bit from each of the numbers of the set may be summed and a most significant bit of the selected number may be set and each subsequent iteration sums bits occupying successive bit positions in their respective numbers and sets a next bit of the selected number.

The selected number may be the $i^{th}$ largest number from the set of n numbers and the threshold value is equal to i. In other examples, the selected number may be the $p^{th}$ smallest number from the set of n numbers and the threshold value is equal to (n−p) or (n−p+1).

Each of the n numbers of the set, if fully generated, may be m-bit numbers.

Outputting data indicative of the selected number may comprise either: outputting the selected number; or outputting an indication of the position, within the set of n numbers, of the selected number.

A ninth further example provides a processing unit configured to generate and select a number, the processing unit comprising: a generation logic unit, implemented in hardware, configured to perform a MSB-first iterative generating process for generating a set of n numbers; a selection logic unit, implemented in hardware, configured to operate concurrently with the generation logic unit, and configured to perform a MSB-first iterative selection process to select either an $i^{th}$ largest or a $p^{th}$ smallest number from the set of n numbers, where i, p and n are integers; and an output arranged to output data indicative of the selected number, wherein the processing unit is configured to, in response to the selection logic unit determining that a particular one of the numbers of said set of n numbers will not be the selected number, cause the generation logic unit to halt the generation of said particular number by said MSB-first iterative generating process after at least one of the bits of said particular number has been generated and before all of the bits of said particular number have been generated.

The selection logic may comprise: summation logic arranged to, in each iteration, sum a bit from each of the numbers to generate a summation result, wherein all the bits being summed occupy an identical bit position within their respective number; comparison logic arranged to, in each iteration, compare the summation result generated by the summation logic in that iteration to a threshold value and set a bit of the selected number based on an outcome of the comparison, wherein the threshold value is calculated based on i or p; and updating logic arranged to, in each iteration and for each of the numbers, selectively update a bit in the number occupying a next bit position based on the outcome of the comparison in that iteration and a value of the bit from the number. The summation logic may be arranged such that in a first iteration, a most significant bit from each of the numbers is summed and each subsequent iteration sums bits occupying successive bit positions in their respective numbers.

A tenth further example provides a processing unit configured to perform the method for generating and selecting a number, as detailed above.

An eleventh further example provides a method of manufacturing, using an integrated circuit manufacturing system, a processing unit as detailed above.

A twelfth further example provides an integrated circuit definition dataset that, when processed in an integrated circuit manufacturing system, configures the integrated circuit manufacturing system to manufacture a processing unit as detailed above.

A thirteenth further example provides a computer readable storage medium having stored thereon a computer readable description of an integrated circuit that, when processed in an integrated circuit manufacturing system, causes the integrated circuit manufacturing system to manufacture a processing unit as detailed above.

A fourteenth further example provides an integrated circuit manufacturing system comprising: a computer readable storage medium having stored thereon a computer readable description of an integrated circuit that describes a processing unit as detailed above; a layout processing system configured to process the integrated circuit description so as to generate a circuit layout description of an integrated circuit embodying the processing unit; and an integrated circuit generation system configured to manufacture the processing unit according to the circuit layout description.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of selecting, in fixed function hardware circuitry, a number from a set of n m-bit numbers, wherein the selected number is either an $i^{th}$ largest or a $p^{th}$ smallest number from the set of n m-bit numbers, where i, p, m and n are integers, the method comprising a plurality of iterations and each of the iterations comprising:
   summing a bit from each of the m-bit numbers to generate a summation result, wherein all the bits being summed occupy an identical bit position within their respective number;
   comparing the summation result to a threshold value, wherein the threshold value is calculated based on i or p;
   setting, based on an outcome of the comparison, a bit of the selected number; and
   for each of the m-bit numbers, based on the outcome of the comparison and a value of the bit from the m-bit number, selectively updating a bit in the m-bit number occupying a next bit position, by
   selectively setting a flag associated with the m-bit number based on the outcome of the comparison and a value of the bit from the m-bit number, said selectively setting a flag comprising:
      in response to determining that the summation result exceeds the threshold value and that the value of the bit is zero, setting a particular flag associated with the m-bit number, and
      in response to determining that the summation result is less than the threshold value and that the value of the bit is one, setting the particular flag associated with the m-bit number and updating the threshold value by an amount equal to the summation result; and
   selectively updating a bit in the m-bit number occupying a next bit position based on values of one or more flags associated with the m-bit number, said selectively updating a bit in the m-bit number occupying a next bit position comprising:
      in response to determining that the particular flag is set, setting the bit in the m-bit number occupying the next bit position to a predefined value, and in response to determining that the particular flag associated with the m-bit number is not set, leaving the bit in the m-bit number occupying the next bit position unchanged;

wherein in a first iteration, a most significant bit from each of the m-bit numbers is summed and a most significant bit of the selected number is set and each subsequent iteration sums bits occupying successive bit positions in their respective numbers and sets a next bit of the selected number, and wherein the method comprises outputting data indicative of the selected number, and using the outputted data for sorting a list of items corresponding to the set of n m-bit numbers.

2. The method according to claim 1, wherein outputting data indicative of the selected number comprises either:
   outputting the selected number; or
   outputting an indication of the position, within the n m-bit numbers, of the selected number.

3. The method according to claim 1, wherein setting, based on an outcome of the comparison, a bit of the selected number comprises:
   in response to determining that the summation result exceeds the threshold value, setting the bit of the selected number to one; and
   in response to determining that the summation result is less than the threshold value, setting the bit of the selected number to zero.

4. The method according to claim 1, wherein, in a $r^{th}$ iteration, summing a bit from each of the m-bit numbers to generate a summation result, comprises summing a bit having a bit index m-r from each of the m-bit numbers to generate a summation result, wherein each bit is either an original bit from one of the m-bit numbers or an updated bit from a previous iteration.

5. The method according to claim 1, wherein the selected number is the $i^{th}$ largest number from the set of n m-bit numbers and the threshold value is equal to i.

6. The method according to claim 1, wherein the selected number is the $p^{th}$ smallest number from the set of n m-bit numbers and the threshold value is equal to (n−p) or (n−p+1).

7. The method according to claim 1, wherein the method further comprises:
   determining how many of the m-bit numbers have an associated flag that is set; and
   in response to determining that n−1 of the m-bit numbers have an associated flag set, outputting data indicative of the m-bit number without an associated flag set.

8. A fixed function hardware circuit arranged to select an $i^{th}$ largest or $p^{th}$ smallest number from a set of n m-bit numbers, where i, p, m and n are integers, the fixed function hardware circuit being arranged to operate iteratively and comprising:
   summation logic, implemented in fixed function hardware circuitry, arranged to, in each iteration, sum a bit from each of the m-bit numbers to generate a summation result, wherein all the bits being summed occupy an identical bit position within their respective number such that in a first iteration, a most significant bit from each of the m-bit numbers is summed and each subsequent iteration sums bits occupying successive bit positions in their respective numbers;
   comparison logic, implemented in fixed function hardware circuitry, arranged to, in each iteration, compare the summation result generated by the summation logic in that iteration to a threshold value and set a bit of the selected number based on an outcome of the comparison, wherein the threshold value is calculated based on i or p;
   flag control logic, implemented in fixed function hardware circuitry, arranged to selectively set a flag associated with the m-bit number based on the outcome of the comparison and a value of the bit from the m-bit number, wherein the flag control logic is arranged to:
   in response to determining that the summation result exceeds the threshold value and that the value of the bit is zero, set a particular flag associated with the m-bit number; and in response to determining that the summation result is less than the threshold value and that the value of the bit is one, set the particular flag associated with the m-bit number and updating the threshold value by an amount equal to the summation result;
   updating logic, implemented in fixed function hardware circuitry, arranged to, in each iteration and for each of the m-bit numbers, selectively update a bit in the m-bit number occupying a next bit position based on the outcome of the comparison in that iteration and a value of the bit from the m-bit number, wherein the updating logic is arranged to:
      selectively update a bit in the m-bit number occupying a next bit position based on values of one or more flags associated with the m-bit number, and
      in response to determining that the particular flag is set, set the bit in the m-bit number occupying the next bit position to a predefined value; and in response to determining that the particular flag is not set, leave the bit in the m-bit number occupying the next bit position unchanged; and
   an output arranged to output data indicative of the selected number, said data being used for sorting a list of items corresponding to the set of n m-bit numbers.

9. The fixed function hardware circuit according to claim 8, further comprising:
   an early exit hardware logic block, implemented in fixed function hardware circuitry, arranged to determine how many of the m-bit numbers have an associated flag that is set; and in response to determining that n−1 of the m-bit numbers have an associated flag set, to output the m-bit number without an associated flag set as the selected number.

10. An integrated circuit manufacturing system comprising:
   a computer readable storage medium having stored thereon a computer readable description of an integrated circuit that describes a fixed function hardware circuit as set forth in claim 8;
   a layout processing system configured to process the integrated circuit description so as to generate a circuit layout description of an integrated circuit embodying the fixed function hardware circuit; and
   an integrated circuit generation system configured to manufacture the fixed function hardware circuit according to the circuit layout description.

* * * * *